US012484875B2

(12) United States Patent
Tanaka et al.

(10) Patent No.: US 12,484,875 B2
(45) Date of Patent: Dec. 2, 2025

(54) ULTRASONIC DIAGNOSTIC APPARATUS

(71) Applicant: TOSHIBA MEDICAL SYSTEMS CORPORATION, Otawara (JP)

(72) Inventors: Go Tanaka, Otawara (JP); Kazuya Akaki, Utsunomiya (JP); Eiji Goto, Utsunomiya (JP); Koichiro Kurita, Nasushiobara (JP); Yu Igarashi, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 1607 days.

(21) Appl. No.: 16/162,840

(22) Filed: Oct. 17, 2018

(65) Prior Publication Data

US 2019/0046153 A1 Feb. 14, 2019

Related U.S. Application Data

(60) Division of application No. 14/966,429, filed on Dec. 11, 2015, now abandoned, which is a continuation of
(Continued)

(30) Foreign Application Priority Data

Jun. 13, 2013 (JP) .................. 2013-124987

(51) Int. Cl.
*A61B 8/06* (2006.01)
*A61B 8/00* (2006.01)
(Continued)

(52) U.S. Cl.
CPC .................. *A61B 8/06* (2013.01); *A61B 8/14* (2013.01); *A61B 8/42* (2013.01); *A61B 8/4444* (2013.01);
(Continued)

(58) Field of Classification Search
None
See application file for complete search history.

(56) References Cited

U.S. PATENT DOCUMENTS 4,641,657 A * 2/1987 Ellis .................. A61B 8/12
606/1
4,873,985 A * 10/1989 Nakajima ........... G01S 15/8925
600/455

(Continued)

FOREIGN PATENT DOCUMENTS

JP 2005-95279 4/2005
JP 2005-124712 5/2005
(Continued)

OTHER PUBLICATIONS

International Search Report issued Sep. 9, 2014 in PCT/JP2014/065799 filed Jun. 13, 2014 (with English translation).
(Continued)

*Primary Examiner* — Chao Sheng
(74) *Attorney, Agent, or Firm* — Oblon, McClelland, Maier & Neustadt, L.L.P.

(57) ABSTRACT

An ultrasonic diagnostic apparatus according to the present embodiment includes an ultrasonic probe, image generation circuitry, acquisition circuitry, calculation circuitry, guide image generation circuitry, and control circuitry. The ultrasonic probe transmits ultrasonic waves, and receives reflected waves. The image generation circuitry generates cross-section image data based on the reflected waves. The acquisition circuitry acquires, from volume data corresponding to three-dimensional region containing a blood vessel inside the subject, cross-section position information corresponding to the cross-section image data. The calculation circuitry calculates collection position information in the volume data based on a running direction of a blood vessel contained in the volume data, the collection position infor-
(Continued)

mation corresponding to a position from which blood flow velocity information is collected. The guide image generation circuitry generates guide image data based on the cross-section position information and the collection position information. The control circuitry causes the guide image data to be displayed.

4 Claims, 15 Drawing Sheets

Related U.S. Application Data application No. PCT/JP2014/065799, filed on Jun. 13, 2014.

(51) Int. Cl.
*A61B 8/08* (2006.01)
*A61B 8/14* (2006.01)

(52) U.S. Cl.
CPC .............. *A61B 8/461* (2013.01); *A61B 8/463* (2013.01); *A61B 8/483* (2013.01); *A61B 8/488* (2013.01); *A61B 8/5207* (2013.01); *A61B 8/54* (2013.01); *A61B 8/085* (2013.01); *A61B 8/4254* (2013.01); *A61B 8/523* (2013.01)

(56) References Cited

U.S. PATENT DOCUMENTS

| | | |
|---|---|---|
| 5,769,079 A | 6/1998 | Hossack |
| 5,806,521 A | 9/1998 | Morimoto et al. |
| 6,464,641 B1 | 10/2002 | Pan |
| 6,801,800 B2 | 10/2004 | Miyazaki et al. |
| 7,066,888 B2 | 6/2006 | Abend |
| 8,340,374 B2 | 12/2012 | Yamagata |
| 2004/0260178 A1 | 12/2004 | Kahn |
| 2005/0119569 A1 | 6/2005 | Ohtake |
| 2005/0124885 A1 | 6/2005 | Abend |
| 2008/0298660 A1 | 12/2008 | Yamagata |
| 2008/0306386 A1* | 12/2008 | Baba ........................ A61B 8/06 600/455 |
| 2011/0196237 A1* | 8/2011 | Pelissier ................ A61B 8/543 600/454 |

FOREIGN PATENT DOCUMENTS

| | | |
|---|---|---|
| JP | 2008-188417 A | 8/2008 |
| JP | 2008-220662 | 9/2008 |
| JP | 2010-68955 | 4/2010 |
| JP | 2011-167331 A | 9/2011 |

OTHER PUBLICATIONS

Written Opinion issued Sep. 9, 2014 in PCT/JP2014/065799 filed Jun. 13, 2014.
Japanese Office Action issued Jan. 16, 2018 in Japanese Patent Application No. 2017-004451, 2 pages.
Office Action issued Dec. 19, 2018 in co-pending U.S. Appl. No. 14/966,429.
Office Action mailed Jul. 11, 2019 in co-pending U.S. Appl. No. 14/966,429, 17 pages.

* cited by examiner

| TH θ =60 DEGREES | |
|---|---|
| FIRST CANDIDATE | 45 DEGREES |
| SECOND CANDIDATE | 48 DEGREES |
| THIRD CANDIDATE | 50 DEGREES |
| ⋮ | ⋮ |

ULTRASONIC DIAGNOSTIC APPARATUS

CROSS-REFERENCE TO RELATED APPLICATIONS

This application is a divisional application of U.S. application Ser. No. 14/966,429, filed Dec. 11, 2015, which is a continuation of PCT international application Ser. No. PCT/JP2014/065799 filed on Jun. 13, 2014, which designates the United States, and is incorporated herein by reference, and which claims the benefit of priority from Japanese Patent Applications No. 2013-124987, filed on Jun. 13, 2013, which is incorporated herein by reference.

FIELD

Embodiments described herein relate generally to an ultrasonic diagnostic apparatus.

BACKGROUND

Conventionally, an ultrasonic diagnostic apparatus uses Doppler information (Doppler signals) extracted from reflected waves of ultrasound waves to generate and display a Doppler spectrum (Doppler waveform) indicating blood flow velocity information. A Doppler waveform is a waveform obtained by plotting blood flow velocities in a time series within a range defined as an observation area by an operator. Such a range is defined by an operator who has referred to a two-dimensional ultrasonic image (two-dimensional B mode image, or two-dimensional color Doppler image).

For example, in a pulsed wave (PW) mode where Doppler waveforms are collected by the PW Doppler method, the operator arranges a sampling gate in a particular part inside a blood vessel in accordance with how the blood vessel runs as visualized in a two-dimensional ultrasonic image. In the PW mode, a Doppler waveform indicating blood flow velocity information in a sampling gate is displayed. Otherwise, for example, in a continuous wave (CW) mode where Doppler waveforms are collected by the CW Doppler method, the operator arranges a sampling marker in the form of a line so that the sampling marker may pass through a blood vessel visualized in a two-dimensional ultrasonic image. In the CW mode, Doppler waveforms indicating all of blood flow velocity information along a scan line (beam line) set at the same position as the sampling marker are displayed.

In order to obtain Doppler information, the operator needs arranging the sampling gate or the sampling marker at an optimum position by adjusting the contact position and the contact angle of an ultrasonic probe with reference to a two-dimensional ultrasonic image. However, the above operation is not easy operation since it is difficult for the operator to know even with reference to a two-dimensional ultrasonic image how a blood vessel runs in a three-dimensional space.

DETAILED DESCRIPTION

An ultrasonic diagnostic apparatus according to the present embodiment includes an ultrasonic probe, image generation circuitry, acquisition circuitry, calculation circuitry, guide image generation circuitry, and control circuitry. The ultrasonic probe transmits ultrasonic waves, and receives reflected waves. The image generation circuitry generates cross-section image data based on the reflected waves. The acquisition circuitry acquires, from volume data corresponding to three-dimensional region containing a blood vessel inside the subject, cross-section position information corresponding to the cross-section image data. The calculation circuitry calculates collection position information in the volume data based on a running direction of a blood vessel contained in the volume data, the collection position information corresponding to a position from which blood flow velocity information is collected. The guide image generation circuitry generates guide image data based on the cross-section position information and the collection position information. The control circuitry causes the guide image data to be displayed.

The following describes an embodiment of an ultrasonic diagnostic apparatus in detail with reference to the accompanying drawings.

Embodiment

Figure 1:
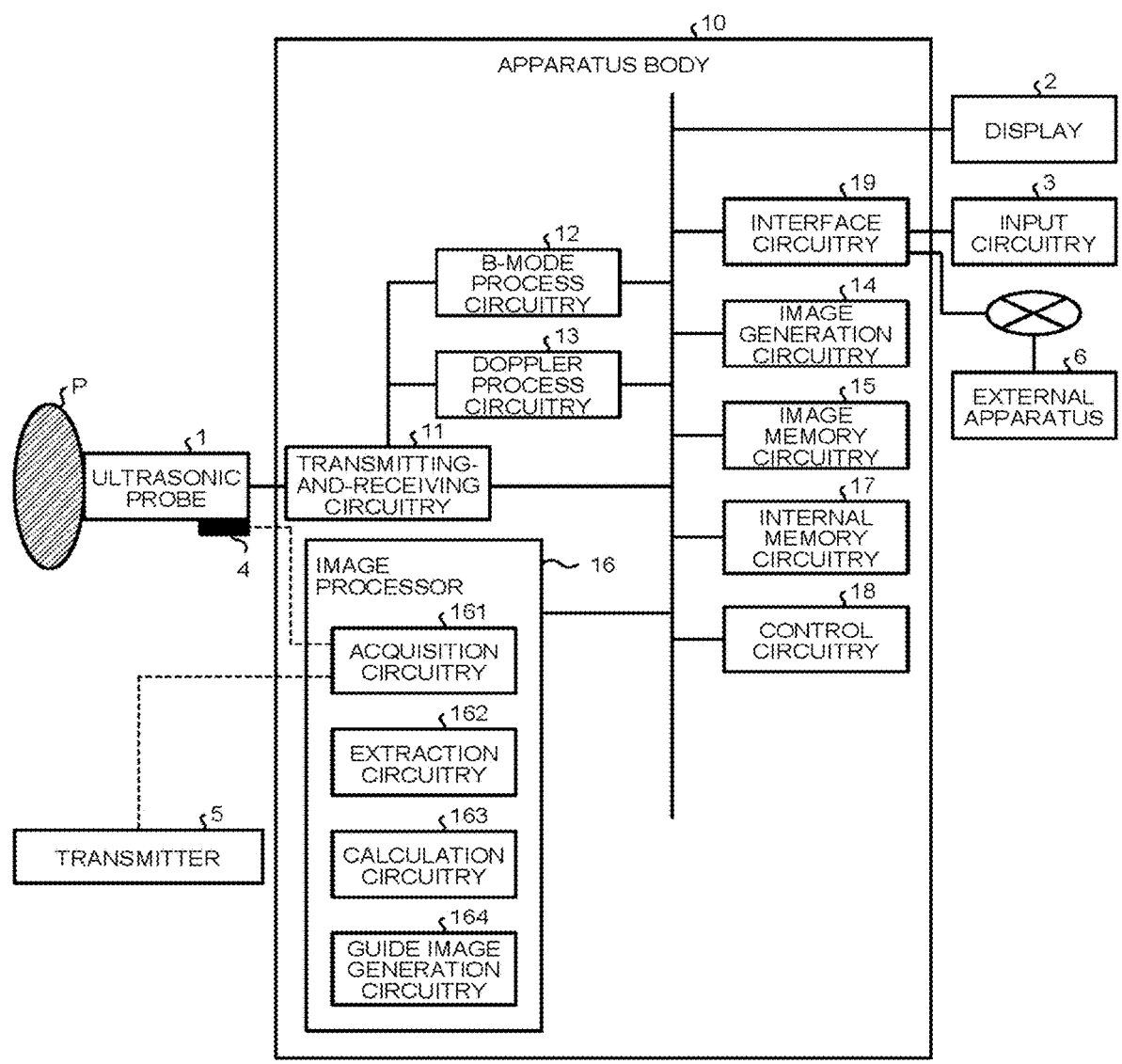
FIG. 1 is a block diagram depicting an exemplary configuration of an ultrasonic diagnostic apparatus according to the present embodiment.

Firstly, the configuration of the ultrasonic diagnostic apparatus according to the present embodiment is described. FIG. 1 is a block diagram illustrating an exemplary configuration of an ultrasonic diagnostic apparatus according to the present embodiment. As depicted in FIG. 1, the ultrasonic diagnostic apparatus according to the present embodiment includes an ultrasonic probe 1, a display 2, input circuitry 3, and an apparatus body 10. A position sensor 4 is attached to the ultrasonic probe 1, and a transmitter 5 is provided near the apparatus body 10. The apparatus body 10 is connected to an external apparatus 6 via a network.

The ultrasonic probe 1 transmits ultrasonic waves into a subject P, and receives reflected waves generated by reflection of the ultrasonic waves inside the subject P. The ultrasonic probe 1 includes, for example, a plurality of piezoelectric transducer elements, and these piezoelectric transducer elements generate ultrasonic waves based on drive signals supplied from transmitting-and-receiving circuitry 11 to be described later of the apparatus body 10. The ultrasonic probe 1 receives reflected waves from the subject P and converts them into electric signals. The ultrasonic probe 1 further includes, for example, a matching layer that is provided on the piezoelectric transducer elements, a backing material that prevents ultrasonic waves from propagating toward the rear from the piezoelectric transducer elements. The ultrasonic probe 1 is detachably connected to the apparatus body 10.

When ultrasonic waves are transmitted to the subject P from the ultrasonic probe 1, the transmitted ultrasonic waves are successively reflected by surfaces across which acoustic impedance is discontinuous in the body tissue of the subject P, and are received by the piezoelectric transducer elements of the ultrasonic probe 1 as reflected wave signals. Here, piezoelectric transducer elements that have received reflected waves convert the corresponding reflected waves into reflected wave signals, which are electric signals. The amplitudes of the reflected wave signals generated by the piezoelectric transducer elements depend on differences in acoustic impedance at the discontinuous surfaces by which the ultrasonic waves are reflected. A reflected wave signal of a transmitted ultrasonic pulse reflected by, for example, the surface of a blood flow or a cardiac wall or the like in motion undergoes frequency deviation due to the Doppler effect depending on the velocity component of the moving body with respect to the transmitting direction of the ultrasonic wave.

The ultrasonic probe 1 connected to the apparatus body 10 is, for example, a one-dimensional ultrasonic probe having a plurality of piezoelectric transducer elements arrayed in a single row. Examples of a one-dimensional ultrasonic probe include sectorial, linear, and convex ultrasonic probes. Otherwise, the ultrasonic probe 1 connected to the apparatus body 10 is, for example, a mechanical 4D probe that two-dimensionally scans the subject P by using a plurality of piezoelectric transducer elements arrayed in a single row and also three-dimensionally scans the subject P by swinging the piezoelectric transducer elements at a given angle (swing angle). Otherwise, the ultrasonic probe 1 connected to the apparatus body 10 is, for example, a 2D probe, which is capable of three-dimensionally scanning the subject P with a plurality of piezoelectric transducer elements disposed in a matrix. A 2D probe is also capable of two-dimensionally scanning the subject P by focusing and transmitting ultrasonic waves.

The ultrasonic diagnostic apparatus according to the present embodiment collects Doppler waveforms by the PW Doppler method or the CW Doppler method as described below. In this embodiment, the ultrasonic probe 1 connected to the apparatus body 10 is an ultrasonic probe capable of not only transmitting and receiving ultrasonic waves for use in photographing B-mode image data and color Doppler image data but also transmitting and receiving ultrasonic waves for use in collecting Doppler waveforms in the PW mode based on the PW Doppler method or in the CW mode based on the CW Doppler method.

Here, as described above, the position sensor 4 is attached to the ultrasonic probe 1. As described above, the transmitter 5 is arranged at any desired position near the apparatus body 10. The position sensor 4 and the transmitter 5 constitute a position detection system for use in detecting position information (the coordinates and the angle) of the ultrasonic probe 1. For example, the position sensor 4 is a magnetic sensor attached to the ultrasonic probe 1. The position sensor 4 is attached to, for example, an end portion of the ultrasonic probe 1. The transmitter 5 is, for example, a device that forms a magnetic field centering around and directed outward from the transmitter 5.

The position sensor 4 detects the intensity and the gradient of a three-dimensional magnetic field formed by the transmitter 5. The position sensor 4 then calculates, on the basis of the detected information on the magnetic field, the position (the coordinates and the angle) of the position sensor 4 in a space having its origin at the transmitter 5, and transmits the calculated position to the apparatus body 10. Here, three-dimensional coordinates and an angle at which the position sensor 4 is located are transmitted as three-dimensional position information of the ultrasonic probe 1 by the position sensor 4 to the apparatus body 10.

The present embodiment is also applicable to a case where the position information of the ultrasonic probe 1 is acquired by use of a system other than the above position detection system. For example, the present embodiment may be applied to a case where the position information of the ultrasonic probe 1 is acquired by use of a gyro sensor or an acceleration sensor.

The input circuitry 3 is connected to the apparatus body 10 via interface circuitry 19 to be described below. The input circuitry 3 includes, for example, a mouse, a keyboard, buttons, panel switches, a touch command screen, a foot switch, a trackball, and a joystick, receives various setting requests from an operator of the ultrasonic diagnostic apparatus, and transfers the received various setting requests to the apparatus body 10.

The display 2 displays a graphical user interface (GUI) for the operator of the ultrasonic diagnostic apparatus to input various setting requests by using the input circuitry 3, and displays ultrasonic image data generated in the apparatus body 10 and other data.

The external apparatus 6 is an apparatus connected to the apparatus body 10 via the interface circuitry 19 to be described below and a network. For example, the external apparatus 6 is a database in a picture archiving and communication system (PACS), which is a system that manages various medical image data, or a database in an electronic health record system that manages electronic health records having medical images attached thereto. Alternatively, the external apparatus 6 is, for example, any one of various medical diagnostic imaging apparatuses, such as an X-ray computed tomography (CT) apparatus and a magnetic resonance imaging apparatus (MRI), other than an ultrasonic diagnostic apparatus according to the present embodiment.

For example, the apparatus body 10 according to the present embodiment can acquire various medical image data uniformly formatted in an image format conforming to DICOM (Digital imaging and Communications in Medicine) from the external apparatus 6 via the interface circuitry 19. For example, the apparatus body 10 acquires via the interface circuitry 19 from the external apparatus 6, via the interface circuitry 19 to be described later, volume data (such as X-ray CT volume data or MRI volume data) to be compared with ultrasonic image data generated by the apparatus body 10.

The apparatus body 10 is an apparatus that generates ultrasonic image data based on reflected wave signals received by the ultrasonic probe 1. For example, the apparatus body 10 according to the present embodiment is an apparatus capable of generating two-dimensional ultrasonic image data based on two-dimensional reflected wave data. Also for example, the apparatus body 10 according to the present embodiment is an apparatus capable of generating three-dimensional ultrasonic image data based on three-dimensional reflected wave data. In the following, three-dimensional ultrasonic image data is referred to as "ultrasonic volume data".

The apparatus body 10 includes the transmitting-and-receiving circuitry 11, B-mode process circuitry 12, Doppler process circuitry 13, image generation circuitry 14, image memory circuitry 15, an image processor 16, internal memory circuitry 17, control circuitry 18, and the interface circuitry 19, as depicted in FIG. 1.

The transmitting-and-receiving circuitry 11 includes, for example, a pulse generator, transmission delay circuitry, and a pulser, and supplies drive signals to the ultrasonic probe 1. The pulse generator repeatedly generates rate pulses to form ultrasonic waves at a given rate frequency. The transmission delay circuitry assigns, to the respective rate pulses generated by the pulse generator, delay times for the respective piezoelectric transducer elements. The delay times are needed for focusing the ultrasonic waves generated by the ultrasonic probe 1 into a beam shape and determining the transmission directivity. The pulser applies the drive signals (drive pulses) to the ultrasonic probe 1 at the timing based on the rate pulses. That is, the transmission delay circuitry varies the delay times assigned to the respective rate pulses, thereby adjusting to any desired direction the transmission direction of the ultrasonic waves transmitted from the plane of the piezoelectric transducer elements.

The transmitting-and-receiving circuitry 11 has a function capable of instantly changing, for example, transmission frequencies or transmission drive voltages in order to execute a given scan sequence on the basis of instructions of the control circuitry 18 to be described below. In particular, changing transmission drive voltages is implemented by oscillator circuitry of a linear amplifier type capable of instantly switching values thereof or by a mechanism that electrically switches a plurality of power supply units.

The transmitting-and-receiving circuitry 11 further includes, for example, a pre-amplifier, an analog-to-digital (A/D) converter, reception delay circuitry, and an adder, and performs a variety of processing on the reflected wave signals received by the ultrasonic probe 1, thereby generating reflected wave data. The pre-amplifier amplifies the reflected wave signal for each channel. The A/D converter performs A/D conversion on the amplified reflected wave signals. The reception delay circuitry provides delay times needed for determining the reception directivity. The adder performs addition processing on the reflected wave signals processed by the reception delay circuitry and generates the reflected wave data. As a result of the addition processing of the adder, the reflection component of the reflected wave signal from a direction corresponding to the reception directivity is emphasized. By the reception directivity and the transmission directivity, an integrated beam of ultrasonic transmission and reception is formed.

When scanning a two-dimensional region inside the subject P, the transmitting-and-receiving circuitry 11 according to the present embodiment causes the ultrasonic probe 1 to transmit an ultrasonic beam configured to scan a two-dimensional region. The transmitting-and-receiving circuitry 11 according to the present embodiment then generates two-dimensional reflected wave data from two-dimensional reflected wave signals received by the ultrasonic probe 1. When scanning a three-dimensional region inside the subject P, the transmitting-and-receiving circuitry 11 according to the present embodiment causes the ultrasonic probe 1 to transmit an ultrasonic beam for scanning a three-dimensional region. The transmitting-and-receiving circuitry 11 according to the present embodiment then generates three-dimensional reflected wave data from three-dimensional reflected wave signals received by the ultrasonic probe 1.

Here, even when the ultrasonic probe 1 is a one-dimensional ultrasonic probe, the ultrasonic diagnostic apparatus according to the present embodiment can generate three-dimensional reflected wave data by using the above-described position detection system. For example, the operator conducts a three-dimensional scan of the subject P by conducting two-dimensional scans of a plurality of cross-sections while varying the position and the angle of the ultrasonic probe 1 with the ultrasonic probe 1 kept in contact with the body surface of the subject P. The transmitting-and-receiving circuitry 11 thus generates two-dimensional reflected wave data of a plurality of cross-sections. For example, the control circuitry 18 can reconstruct three-dimensional reflected wave data by three-dimensionally arranging two-dimensional reflected wave data of a plurality of cross-sections, on the basis of three-dimensional position information of the ultrasonic probe 1 acquired from the position detection system.

The form of the output signal from the transmitting-and-receiving circuitry 11 is selectable from various forms such as a case of a signal referred to as a radio frequency (RF) signal in which phase information is included and a case of amplitude information after envelope detection processing.

The B-mode process circuitry 12 receives the reflected wave data from the transmitting-and-receiving circuitry 11, performs such processing as logarithmic amplification and envelope detection processing, and generates data in which the signal intensity is expressed by the luminance of brightness (B-mode data).

The Doppler process circuitry 13 performs frequency analysis on velocity information from the reflected wave data received from the transmitting-and-receiving circuitry 11, extracts a blood flow, tissue, or the echo component of a contrast agent on the basis of the Doppler effect, and generates data (Doppler data) containing moving body information such as the velocity, the dispersion, and the power extracted at multi-points. A moving body in the present embodiment is blood that flows in a blood vessel.

The B-mode process circuitry 12 and the Doppler process circuitry 13 according to the present embodiment can process both two-dimensional reflected wave data and three-dimensional reflected wave data.

The image generation circuitry 14 generates ultrasonic image data generated by the B-mode process circuitry 12 and the Doppler process circuitry 13. That is, the image generation circuitry 14 generates, from B-mode data generated by the B-mode process circuitry 12, B-mode image data in which the signal intensity is expressed by brightness. The image generation circuitry 14 also generates color Doppler image data from Doppler data generated by the Doppler process circuitry 13. The color Doppler image data is average velocity image data, dispersion image data, power image data, or a combination of any of the forgoing data, which indicates moving body information (information on moves of a blood flow or tissue).

Here, the image generation circuitry 14, in general, converts (scan-converts) the scan line signal sequences of ultrasonic scans into scan line signal sequences of a video format typified by television and the like, thereby generating ultrasonic image data for display. Specifically, the image generation circuitry 14 performs coordinate conversion depending on the scanning form of ultrasonic waves by the ultrasonic probe 1, thereby generating the ultrasonic image data for display. The image generation circuitry 14 further performs, as a variety of image processing other than the scan conversion, processing by using a plurality of image frames after the scan conversion. Examples of the processing include: image processing (smoothing processing) to regenerate an image with the average luminance value; and image processing (edge enhancement processing) that applies a differential filter within the images. The image generation circuitry 14 combines character information on various parameters, scales, body marks, and other information with the ultrasonic image data.

That is, the B-mode data and the Doppler data are ultrasonic image data before scan conversion processing, and the data that the image generation circuitry 14 generates is the ultrasonic image data for display after scan conversion processing. The B-mode data and the Doppler data are also referred to as raw data.

The image generation circuitry 14 can also generate M-mode image data from time-series data of B-mode data on one scan line generated by the B-mode process circuitry 12. The image generation circuitry 14 can also generate, from Doppler data generated by the Doppler process circuitry 13, a Doppler waveform obtained by plotting blood flow velocity information in a time series.

Furthermore, the image generation circuitry 14 performs coordinate conversion on three-dimensional B-mode data generated by the B-mode process circuitry 12, thereby generating three-dimensional B-mode image data. The image generation circuitry 14 further performs coordinate conversion on three-dimensional Doppler data generated by the Doppler process circuitry 13, thereby generating three-dimensional Doppler image data. Three-dimensional B-mode data and three-dimensional Doppler data are treated as volume data before scan conversion. That is, the image generation circuitry 14 generates "three-dimensional B-mode data and three-dimensional Doppler data" as "ultrasonic volume data".

Moreover, the image generation circuitry 14 performs rendering processing on ultrasonic volume data to generate various kinds of two-dimensional image data for displaying the ultrasonic volume data on the display 2. One example of the rendering processing to be performed by the image generation circuitry 14 is processing to generate multi-planar reconstruction (MPR) image data from the volume data by applying MPR. Other examples of the rendering processing to be performed by the image generation circuitry 14 are processing to apply "curved MPR" to the volume data and processing to apply "maximum intensity projection" to the volume data. Still another example of the rendering processing to be performed by the image generation circuitry 14 is volume rendering (VR) processing to generate two-dimensional image data having three-dimensional information incorporated therein.

The image generation circuitry 14 can also perform the above various kinds of rendering processing on volume data collected by another medical diagnostic imaging apparatus. Such volume data is three-dimensional X-ray CT image data (X-ray CT volume data) collected by an X-ray CT apparatus or three-dimensional MRI image data (MRI volume data) collected by an MRI apparatus. In one exemplary case, on the basis of information acquired by acquisition circuitry 161 described below, the image generation circuitry 14 generates two-dimensional X-ray CT image data from X-ray CT volume data by applying MPR processing using a cross-section corresponding to a scan cross-section in two-dimensional ultrasonic image data currently generated.

The image memory circuitry 15 is a memory that stores therein the image data for display generated by the image generation circuitry 14. The image memory circuitry 15 can also store therein the data generated by the B-mode process circuitry 12 and the Doppler process circuitry 13. The B-mode data and the Doppler data stored in the image memory circuitry 15 can be called up by the operator after diagnosis, and are made into the ultrasonic image data for display via the image generation circuitry 14, for example.

In the present embodiment, the image processor 16 is installed in the apparatus body 10 to assist collection of Doppler waveforms. The image processor 16 includes the acquisition circuitry 161, extraction circuitry 162, calculation circuitry 163, and guide image generation circuitry 164 as depicted in FIG. 1.

The acquisition circuitry 161 acquires cross-section position information in volume data corresponding to a three-dimensional region containing a blood vessel inside the subject P. The cross-section position information is position information corresponding to a cross-section position of cross-section image data. That is, on the basis of the reflected waves received by the ultrasonic probe 1, the image generation circuitry 14 generates cross-section image data corresponding to a two-dimensional region inside the subject P. The acquisition circuitry 161 acquires, in the volume data, position information corresponding to a cross-section position of the cross-section image data generated by the image generation circuitry 14. For example, the acquisition circuitry 161 according to the present embodiment acquires the cross-section position information in volume data, which is three-dimensional medical image data, by acquiring a correspondence relation that specifies the position of a cross-section corresponding to a scan cross-section of the ultrasonic probe 1. The above volume data is volume data photographed by a medical diagnostic imaging apparatus of a kind other than an ultrasonic diagnostic apparatus, and is X-ray CT volume data, for example.

Figure 2:
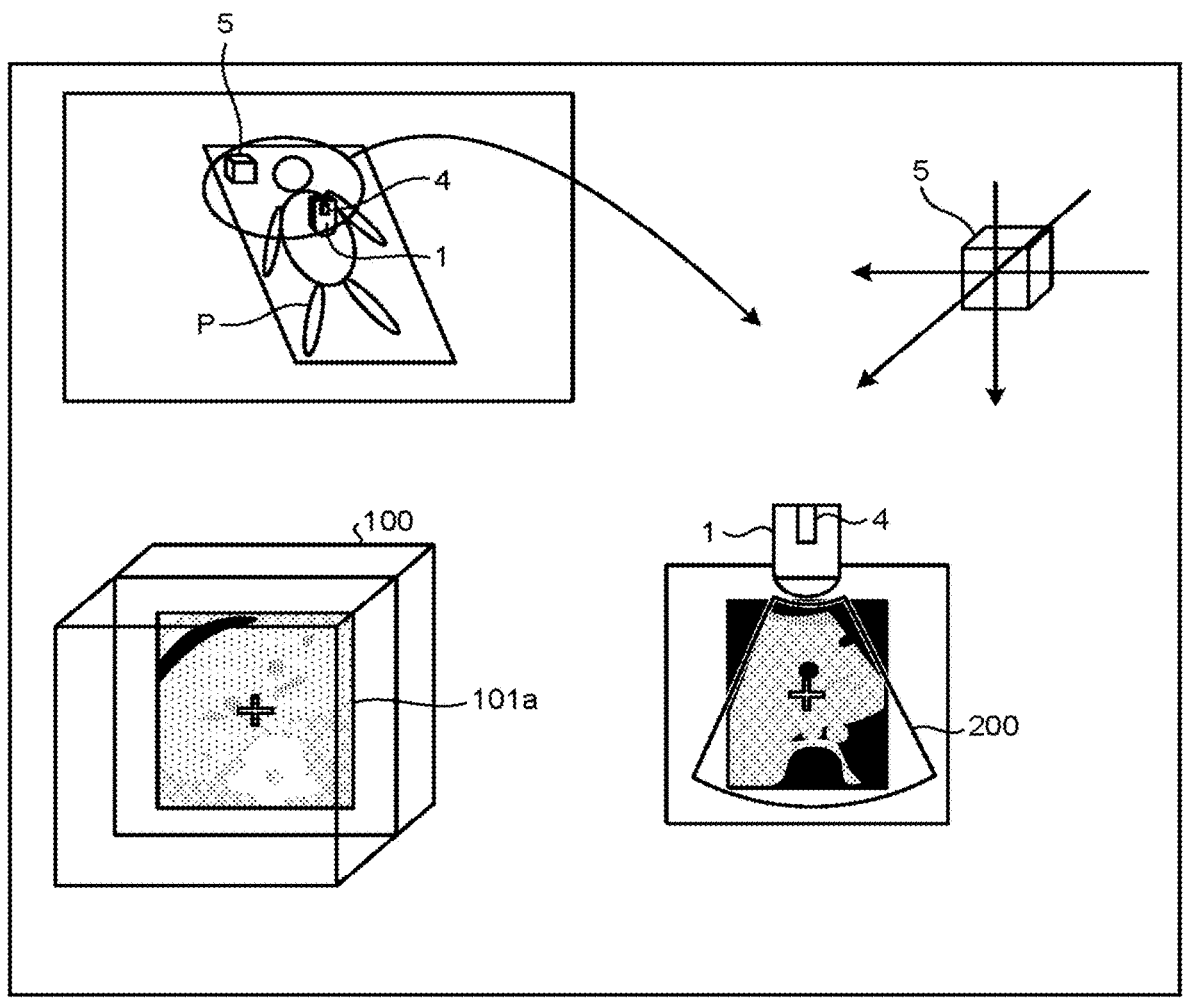
FIG. 2 and FIG. 3 are illustrations for explaining acquisition circuitry.
Figure 3:
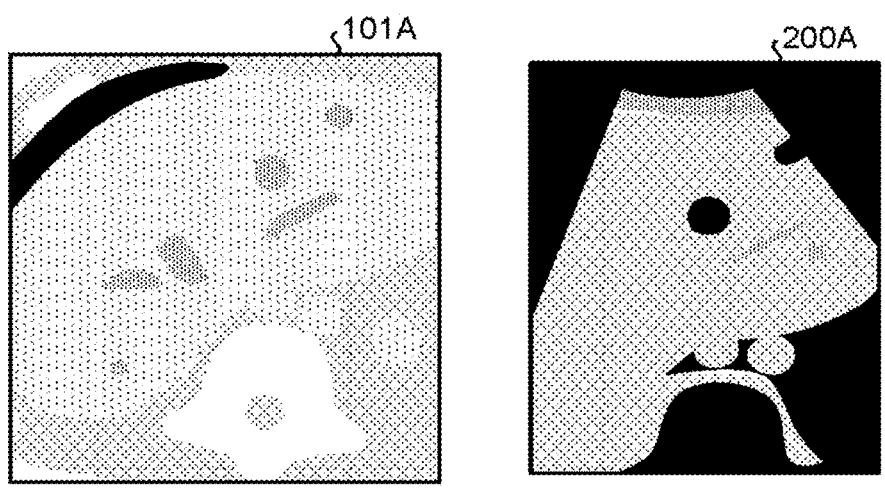

The correspondence relation acquired by the acquisition circuitry 161 is conventionally used for a "simultaneous display function". The "simultaneous display function" is the function of simultaneously displaying on a screen of the display 2 in real time: two-dimensional ultrasonic image data of a scan cross-section subject to change following a move of the ultrasonic probe 1; and two-dimensional X-ray CT image data of X-ray CT volume data having its positions matched with respective corresponding positions of the two-dimensional ultrasonic image data. FIG. 2 and FIG. 3 are illustrations for explaining the acquisition circuitry.

As depicted in FIG. 2, the acquisition circuitry 161 acquires, from the position detection system composed of the position sensor 4 attached to the ultrasonic probe 1 and the transmitter 5, three-dimensional position information (the coordinates and the angle) on the ultrasonic probe 1 in an actual space.

In executing the "simultaneous display function", the three axes (X, Y, Z) of the ultrasonic probe 1 are aligned with the three axes of X-ray CT volume data 100 (refer to FIG. 2). For example, an operator presses down a set button while keeping the ultrasonic probe 1 having the position sensor 4 attached thereto in vertical contact with the subject P. The acquisition circuitry 161 sets straight three axes defined as those extending in directions perpendicular to one another, from three-dimensional position information of the ultrasonic probe 1 acquired when the set button is pressed down.

Subsequently, as depicted in FIG. 2, the operator presses the set button again after moving the ultrasonic probe 1 so as to have ultrasonic image data 200 displayed in which a feature portion that is the same as a feature portion visualized in MPR image data 101a of the X-ray CT volume data 100 is visualized. Furthermore, the operator specifies the feature portion in the MPR image data 101a and the feature portion in the ultrasonic image data 200, for example, using a mouse. As a feature portion, a blood vessel, a xiphisternum, or the like is used, for example.

The acquisition circuitry 161 acquires the correspondence relation among the position of "any given scan cross-section" in the actual space, the position of the "any given scan cross-section" in ultrasonic image data generated by an ultrasonic scan, and the position of a cross-section in the X-ray CT volume data 100 that corresponds to the "any given scan cross-section", on the basis of: three-dimensional position information of the ultrasonic probe 1 acquired when the set button is pressed down again; position information of the feature portion in the X-ray CT volume data 100; and position information of the feature portion in the ultrasonic image data 200.

For example, the control circuitry 18 can use the above correspondence relation to specify a cross-section in the X-ray CT volume data 100 that corresponds to a scan cross-section, and the image generation circuitry 14 can then generate MPR image data from the X-ray CT volume data 100 by using the cross-section specified by the control circuitry 18. Thus, the display 2 simultaneously displays ultrasonic image data 200A of a moved scan cross-section and MPR image data 101A of the same cross-section.

Here, the above correspondence relation can convert the coordinates of the "any given scan cross-section" in ultrasonic image data generated by an ultrasonic scan into coordinates in the X-ray CT volume data 100. The above correspondence relation can also convert the coordinates of any given position in the X-ray CT volume data 100 into coordinates in the ultrasonic image data.

With reference to FIG. 1 again, the extraction circuitry 162 extracts a blood vessel region contained in volume data. For example, the extraction circuitry 162 extracts a voxel having a CT value corresponding to blood, thereby extracting a blood vessel region contained in the X-ray CT volume data 100. The present embodiment may be applied to a case where the operator extracts a blood vessel region in volume data by manually setting the position of a blood vessel.

Processing to be performed by the calculation circuitry 163 and the guide image generation circuitry 164 in the present embodiment by using the correspondence relation acquired by the acquisition circuitry 161 and the blood vessel region extracted by the extraction circuitry 162 will be described later in detail.

The internal memory circuitry 17 stores therein control programs to perform transmission and reception of ultrasonic waves, image processing, and display processing, and a variety of data such as diagnostic information (for example, patient IDs and doctor's findings), diagnosis protocols, and various body marks. The internal memory circuitry 17 is used also for such purposes as archiving image data stored in the image memory circuitry 15 as necessary.

Furthermore, the internal memory circuitry 17 is used also for archiving various medical images transferred from the external apparatus 6. Specifically, the internal memory circuitry 17 stores therein volume data conforming to the DICOM standards that has been transferred from the external apparatus 6 via the interface circuitry 19 to be described later. In the present embodiment, the internal memory circuitry 17 stores therein volume data (for example, X-ray CT volume data or MRI volume data) containing a blood vessel of the subject P from which Doppler waveforms are collected.

The control circuitry 18 controls the entire processing of the ultrasonic diagnostic apparatus. Specifically, on the basis of various setting requests input from the operator via the input circuitry 3 and various control programs and various data loaded from the internal memory circuitry 17, the control circuitry 18 controls processing in the transmitting-and-receiving circuitry 11, the B-mode process circuitry 12, the Doppler process circuitry 13, the image generation circuitry 14, and the image processor 16. The control circuitry 18 performs control so that ultrasonic image data for display stored in the image memory circuitry 15 or the internal memory circuitry 17 can be displayed on the display 2. The control circuitry 18 also performs control so that processing result of the image processor 16 can be displayed on the display 2.

The interface circuitry 19 is an interface with the input circuitry 3, a network, and the external apparatus 6. Various setting requests and various instructions from the operator received by the input circuitry 3 are transferred to the control circuitry 18 by the interface circuitry 19. The interface circuitry 19 notifies, via a network, the external apparatus 6 of a request to transfer image data, the request having been received by the input circuitry 3 from the operator. Image data transferred by the external apparatus 6 is stored in the internal memory circuitry 17 by the interface circuitry 19.

The foregoing describes the overall configuration of the ultrasonic diagnostic apparatus according to the present embodiment. With the foregoing configuration, the ultrasonic diagnostic apparatus according to the present embodiment collects Doppler waveforms indicating blood flow velocity information based on Doppler information.

Conventionally, when Doppler waveforms are collected, the operator searches, in the B mode or in the color Doppler mode, for a scan cross-section that results in visualization of a blood vessel as an observation area from which the operator intends to collect Doppler waveforms. The operator then, with reference to two-dimensional ultrasonic image data (two-dimensional B mode image data or two-dimensional color Doppler image data), determines a scan cross-section for collecting Doppler waveforms (a scan cross-section for collecting blood flow information). In the following, a scan cross-section scanned by the ultrasonic probe 1 for collecting blood flow velocity information is referred to as a "collection cross-section".

The operator then arranges, in the collection cross-section, a range from which Doppler waveforms are collected. In the following, a range arranged in a collection cross-section for blood flow information collection is referred to as a "collection range". For example, in the PW mode, the operator arranges a sampling gate in an observation area inside a blood vessel, in accordance with how the blood vessel runs as visualized in two-dimensional ultrasonic image data of a collection cross-section, the sampling gate being the collection range. In the PW mode, Doppler waveforms indicating blood flow velocity information in the sampling gate are displayed.

Figure 4:
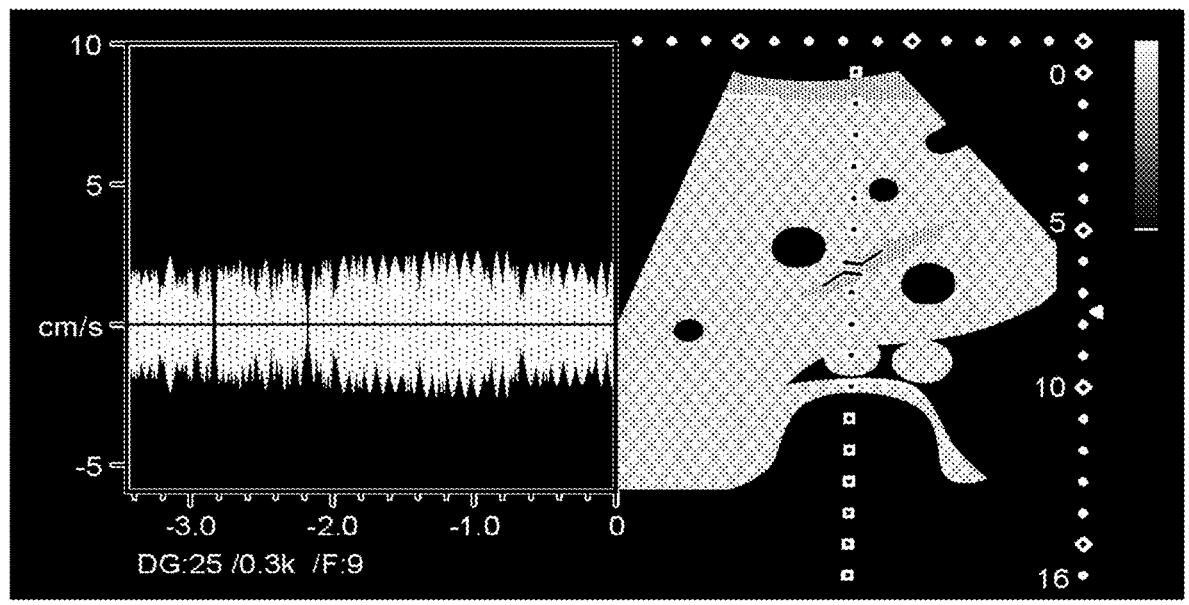
FIG. 4 is an illustration depicting one example of settings that are conventionally applied in Doppler waveform collection in the PW mode.

For example, in the CW mode, the operator arranges a linear sampling marker so that the sampling marker may pass through a blood vessel containing an observation area visualized in two-dimensional ultrasonic image data of the collection cross-section. In the CW mode, Doppler waveforms indicating all of blood flow velocity information along a scan line set at the same position as the sampling marker are displayed. FIG. 4 is an illustration depicting one example of settings that are conventionally applied in Doppler waveform collection in the PW mode.

The right illustration in FIG. 4 depicts B mode image data of a collection cross-section displayed on the display 2. Specifically, the right illustration in FIG. 4 depicts B mode image data, of a collection cross-section, in which a long-axis cross-section of a blood vessel under observation has been visualized. The operator arranges a sampling gate in the long-axis cross-section of the blood vessel in the B mode image data (refer to the parallel double line depicted in the right illustration in FIG. 4). The operator or the control circuitry 18 then arranges a line marker at the position of a scan line that passes through the sampling gate and that allows scanning inside the collection cross-section (refer to the dotted line depicted in the right illustration in FIG. 4). Here, blood flow velocity information obtained from Doppler information is not blood flow velocity information in the running direction of the blood vessel, but is blood flow velocity information in a direction of the scan line on the line marker. Here, the angle between the blood flow direction (the running direction of the blood vessel) and the direction of the scan line is denoted as "θ". The Doppler process circuitry 13 makes angle correction, using "1/cos θ", to the blood flow velocity information obtained from the Doppler information, thereby obtaining the blood flow velocity information in the running direction of the blood vessel.

The operator not only arranges the sampling gate and the line marker, but also arranges an angle marker parallel to the running direction of the blood vessel in the sampling gate so that the Doppler process circuitry 13 can be notified of "θ" for making the angle correction (refer to two line segments that cross over the parallel double line in the right illustration in FIG. 4). The direction of the angle marker can be adjusted by the operator. The Doppler process circuitry 13 obtains "θ" from the angle between the line marker and the angle marker, and makes the angle correction.

Position information of the sampling gate and the line marker serves as position information for defining the collection range from which Doppler information is sampled. Position information of the angle marker, which is information for the angle correction, can also be included as the position information for defining the collection range.

After completing the arrangement of the sampling gate and the line marker and adjustment of the angle marker, the operator then inputs, via the input circuitry 3, a request to start collection of Doppler waveforms in the PW mode. Consequently, collection of Doppler waveforms is started, and the display 2 displays thereon a Doppler waveform as depicted in the left illustration in FIG. 4.

In the CW mode, a sampling marker and an angle marker, which correspond to a line marker in the PW mode, are arranged. In the CW mode, position information of a sampling marker, which passes through a blood vessel, serves as position information for defining a collection range from which Doppler information is sampled. In the CW mode, position information of an angle marker, which is information for angle correction, can be additionally included as the position information for defining the collection range.

In order to obtain Doppler information, the operator needs arranging a collection range by adjusting the contact position and the contact angle of the ultrasonic probe 1 to the optimum position and angle thereof with reference to two-dimensional ultrasonic image data. The optimum contact position and the optimum contact angle of the ultrasonic probe 1 are, for example, a position and an angle that give the smallest value of "θ". As the angle "θ" between the running direction of the blood vessel and the direction of the scan lines approaches "0 degrees", "1/cos θ" approaches "1", resulting in a smaller error in the blood flow velocity information due to the angle correction. On the other hand, as the angle "θ" between the running direction of the blood vessel and the direction of the scan lines increases, "1/cos θ" becomes smaller, resulting in a larger error in the blood flow velocity information due to the angle correction.

However, it is difficult for the operator to know, even with reference to two-dimensional ultrasonic image data, how a blood vessel runs in a three-dimensional space. Hence, arranging the collection range so that the angle between the running direction of the blood vessel and the direction of the scan line can be as small as possible is a difficult operation for the operator. In addition, even when the operator has determined that a long-axis cross-section of a blood vessel under observation has been visualized, a cross-section that the operator refers to actually disagrees with a long-axis cross-section in some cases because the image data is two-dimensional. In such a case, an error is incurred in "θ" because the angle marker is not set parallel to the running direction of the blood vessel. Consequently, blood flow velocity information cannot be accurately obtained.

To address this inconvenience, the present embodiment includes the calculation circuitry 163 and the guide image generation circuitry 164 configured to perform the following processing by using, for example, a blood vessel region extracted by the extraction circuitry 162 as well as the cross-section position information acquired by the acquisition circuitry 161 by use of the correspondence relation, for the purpose of simplifying operations that the operator performs to display the optimum blood flow velocity information. The following description focuses on processing to be performed in the PW mode. Note that the acquisition circuitry 161 acquires a correspondence relation of volume data (for example, the X-ray CT volume data 100) before the following processing is started.

The calculation circuitry 163 calculates collection position information, which is position information in volume data (volume data of another kind) that corresponds to a position from which blood flow velocity information is collected, on the basis of the running direction of the blood vessel in the volume data. Here, the position from which blood flow velocity information is collected is a collection range arranged in a collection cross-section to be scanned by the ultrasonic probe for collecting blood flow velocity information. The calculation circuitry 163 calculates, as the collection position information, position information in the volume data that corresponds to both of the collection cross-section and the collection range. Specifically, on the basis of the running direction of a blood vessel contained in volume data (volume data of another kind), the calculation circuitry 163 calculates, in the volume data, position information of a collection range and a collection cross-section whereby collected blood flow velocity information has an error within a tolerable range. That is, the calculation circuitry 163 calculates, not in the actual space but in a virtual space in volume data of another kind from which a blood vessel region can be extracted, collection position information serving as position information of a collection range for collecting Doppler waveforms and of a collection cross-section in which the collection range is arranged.

The guide image generation circuitry 164 then generates guide image data on the basis of the cross-section position information and the collection position information. Specifically, using the correspondence relation and the collection position information, the guide image generation circuitry 164 generates guide image data that the operator uses to move the ultrasonic probe 1 to a position that allows scanning of the collection cross-section having the collection range arranged therein. More specifically, the guide image generation circuitry 164 uses two-dimensional image data generated from the volume data (volume data of another kind). This two-dimensional image data is, for example, VR image data of the X-ray CT volume data 100. The VR image data may be generated by the image generation circuitry 14 or may be generated by the guide image generation circuitry 164. Then, on this two-dimensional image data, the guide image generation circuitry 164 superimposes, at a position based on the cross-section position information, a marker indicating a current scan cross-section of the ultrasonic probe 1, and also superimposes, at a position based on the collection position information, a marker indicating the collection range and the collection cross-section. Thus, the guide image generation circuitry 164 generates the guide image data. The guide image data serves as an image for navigation for the operator to perform an operation to move the ultrasonic probe 1.

Figure 5:
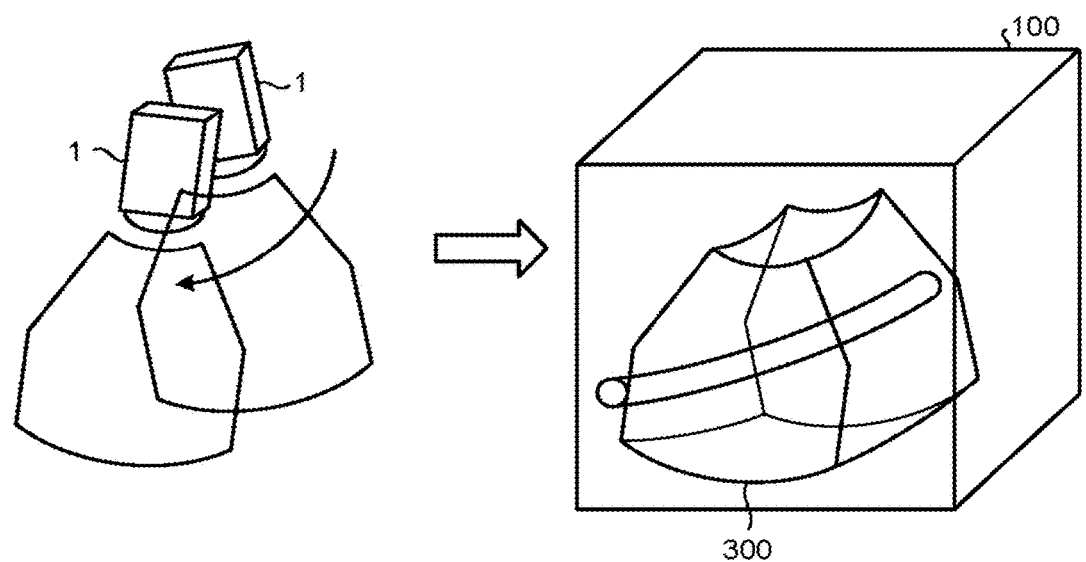
FIG. 5 is an illustration depicting one example of processing for acquiring a three-dimensional range.

At the start, the calculation circuitry 163 acquires, in the volume data, a three-dimensional range corresponding to a three-dimensional scan range which can be scanned by the ultrasonic probe 1. Here, the three-dimensional scan range is acquired by having the operator move the ultrasonic probe 1 within a possible range while keeping the ultrasonic probe 1 in contact with the body surface of the subject P. The calculation circuitry 163 then calculates the position of the three-dimensional range from the three-dimensional scan range and the correspondence relation already acquired by the acquisition circuitry 161. FIG. 5 is an illustration depicting one example of processing for acquiring the three-dimensional range.

For example, ultrasonic scanning of the heart is performed with the ultrasonic probe 1 kept in contact with a portion between ribs. That is, the ultrasonic probe 1 cannot necessarily scan a cross-section that contains an observation area at any given contact position and contact angle. To avoid this inconvenience, for example, the operator defines a three-dimensional scan range by moving the ultrasonic probe 1 within a range that can be scanned thereby as depicted in the left illustration in FIG. 5 with the ultrasonic probe 1 kept in contact with the body surface of the subject P. The acquisition circuitry 161 acquires position information of the three-dimensional scan range in the actual space from the position sensor 4, and notifies the calculation circuitry 163 thereof. The calculation circuitry 163 then calculate, in the X-ray CT volume data 100, the position of three-dimensional range 300 corresponding to the three-dimensional scan range as depicted in the left illustration in FIG. 5, on the basis of position information of the three-dimensional scan range in the actual space, and the cross-section position information (for example, the cross-section position information acquired from the correspondence relation). The three-dimensional range 300 is a range that is searched for the collection range and the collection cross-section in the X-ray CT volume data 100. Limiting the range to the three-dimensional range 300 reduces a load needed for processing of calculating position information of the collection range and the collection cross-section from which optimum Doppler waveforms can be collected.

Figure 6:
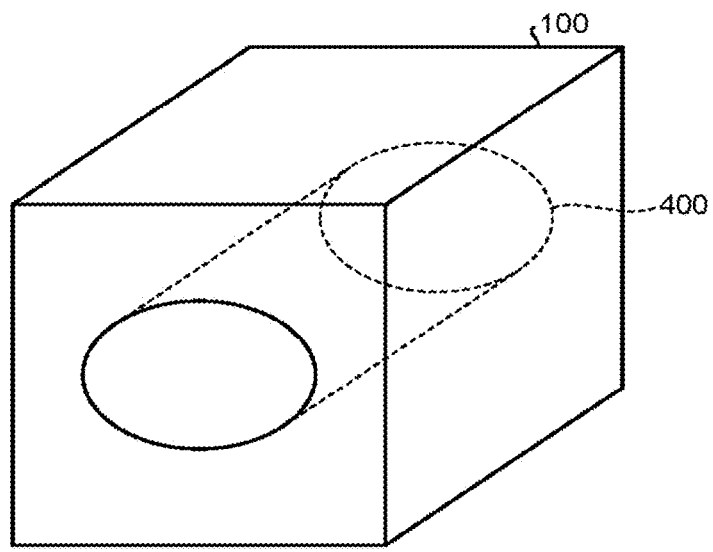
FIG. 6 is an illustration depicting another example of processing for acquiring a three-dimensional range.

However, the position of the three-dimensional range 300 may be calculated without the use of the correspondence relation. In such a case, the calculation circuitry 163 calculates the position of the three-dimensional ranges by using information indicating where a body surface of the subject P is located in the X-ray CT volume data 100. FIG. 6 is an illustration depicting another example of processing for acquiring the three-dimensional range. For example, the calculation circuitry 163 calculates the position of a body surface 400 of the subject P in the X-ray CT volume data 100 as depicted in FIG. 6 by using a CT value corresponding to the air. The body surface 400 is a range with which the ultrasonic probe 1 can make contact. For example, the calculation circuitry 163 calculates the position of the three-dimensional range 300 on the basis of the position of the body surface 400 in the X-ray CT volume data 100, and the shape and the size of a cross-section two-dimensionally scanned by the ultrasonic probe 1.

Note that, for example, the calculation circuitry 163 may calculate a bone region of the subject P in the X-ray CT volume data 100 by using a CT value corresponding to a bone and then calculate the position of the three-dimensional range 300 by further using the position of the bone region. Alternatively, the calculation circuitry 163 may calculate the position of the three-dimensional range 300 by further using a range that is a part of the body surface 400 as specified by the operator.

After the completion of scanning the three-dimensional scan range, the operator uses the input circuitry 3 to input a request to start navigation while keeping the ultrasonic probe 1 scanning a cross-section in the three-dimensional scan range. This inputting causes the calculation circuitry 163 and the guide image generation circuitry 164 to start the following navigation processing. FIG. 7 to FIG. 13 are illustrations for explaining the navigation processing to be performed by the calculation circuitry and the guide image generation circuitry.

Figure 7:
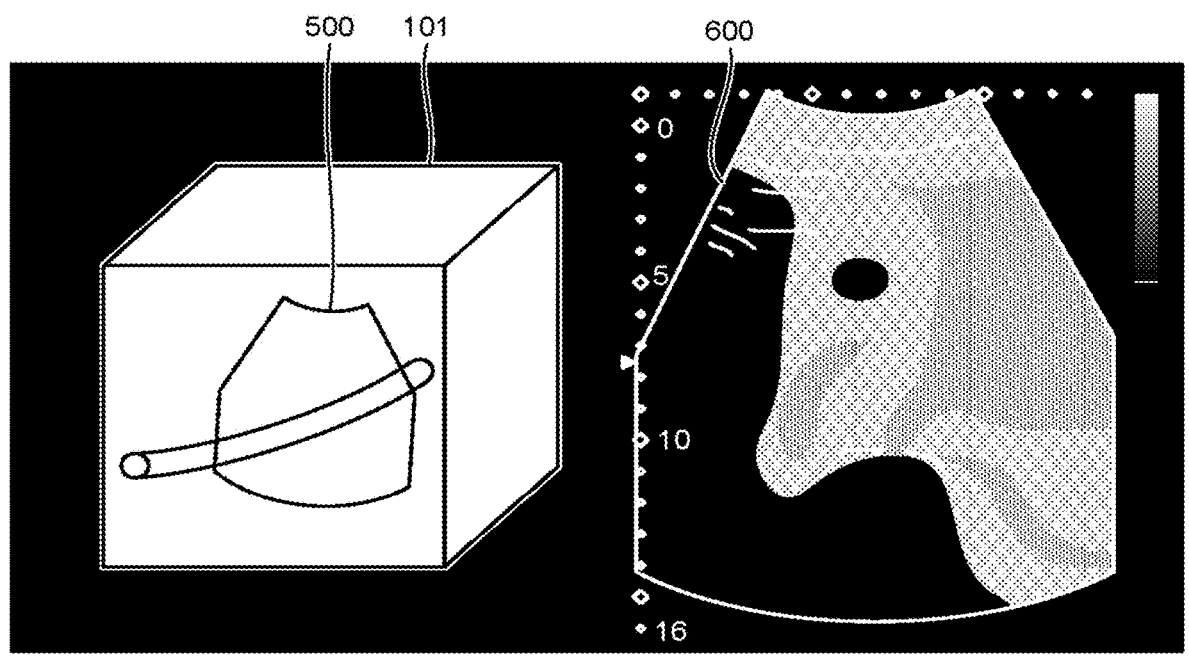
FIG. 7, FIG. 8, FIG. 9, FIG. 10, FIG. 11, FIG. 12 and FIG. 13 are illustrations for explaining navigation processing to be performed by calculation circuitry and guide image generation circuitry.

The right illustration in FIG. 7 depicts B mode image data as cross-section image data of a current scan cross-section. The left illustration in FIG. 7 depicts the above-described VR image data 101 generated from the X-ray CT volume data 100. The calculation circuitry 163 acquires the position information of the current scan cross-section from the acquisition circuitry 161, and, by using the acquired position information and the correspondence relation, calculates the position of a cross-section in the X-ray CT volume data 100 (hereinafter, referred to as a corresponding scan cross-section) that corresponds to the current scan cross-section. As depicted in FIG. 7, the guide image generation circuitry 164 superimposes, in the VR image data 101, a frame 500 applicable to the corresponding scan cross-section at the position calculated by the calculation circuitry 163. Additionally, as depicted in FIG. 7, the image generation circuitry 14 superimposes, on B mode image data of the current scan cross-section, a frame 600 corresponding to the current scan cross-section. For example, the frame 500 and the frame 600 are depicted as yellow solid lines. Note that a blood vessel is visualized in the VR image data 101.

The input circuitry 3 then receives, from the operator, designation of an observation area within the volume data. For example, as depicted in the left illustration in FIG. 8, the operator clicks the mouse after moving the cursor of the mouse inside the blood vessel in the VR image data 101. The VR image data 101 is an image generated from the X-ray CT volume data 100, which includes three-dimensional information. Therefore, the calculation circuitry 163 is capable of calculating the three-dimensional position of a position designated by the operator as an observation area.

Figure 9:
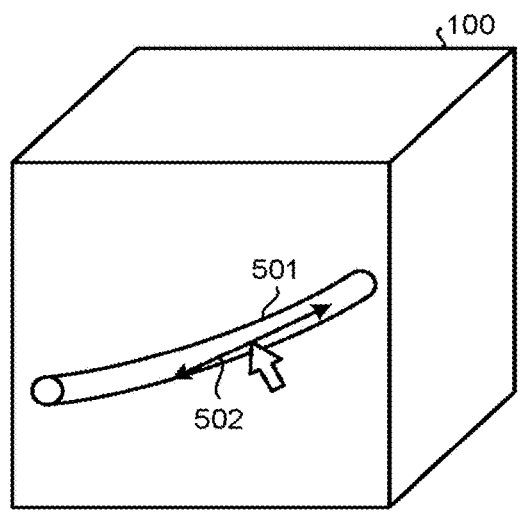

With this capability, as depicted in FIG. 9, the calculation circuitry 163 calculates the three-dimensional position in the X-ray CT volume data 100 of an observation area designated in the VR image data 101. Then, as depicted FIG. 9, the extraction circuitry 162 uses a CT value to extract a blood vessel region 501 located at the three-dimensional position of the observation area. In the present embodiment, the extraction circuitry 162 may extract a blood vessel wall from the blood vessel region 501. Furthermore, in the present embodiment, the extraction circuitry 162 may have extracted a blood vessel region (or a blood vessel wall) all of the X-ray CT volume data 100 in advance.

The calculation circuitry 163 then calculates the running direction of the blood vessel in the observation area by using a blood vessel region 501. For example, as depicted in FIG. 9, the calculation circuitry 163 calculates a blood vessel running vector 502 in the observation area. FIG. 9 illustrates the blood vessel running vector 502 as a double-headed arrow.

The calculation circuitry 163 then calculates the position and the angle of a scan line that follows the running direction of the blood vessel (the blood vessel running vector 502) in the X-ray CT volume data 100. The scan line that follows the running direction of the blood vessel (the blood vessel running vector 502) is an optimum scan line that gives the smallest error in blood flow velocity information collected from the observation area. The position and the angle of the optimum scan line that gives the smallest error in blood flow velocity information collected from the observation area is the position and the angle of a scan line that passes through the observation area and runs in the same direction as the running direction of the blood vessel. The calculation circuitry 163 calculates the position and angle of the optimum scan line in the X-ray CT volume data 100. The calculation circuitry 163 then defines, as an optimum line corresponding to the optimum scan line, a line determined from the calculated position and angle. The calculation circuitry 163 then calculates position information (collection position information) of the collection range and the collection cross-section by using the optimum line.

Figure 10:
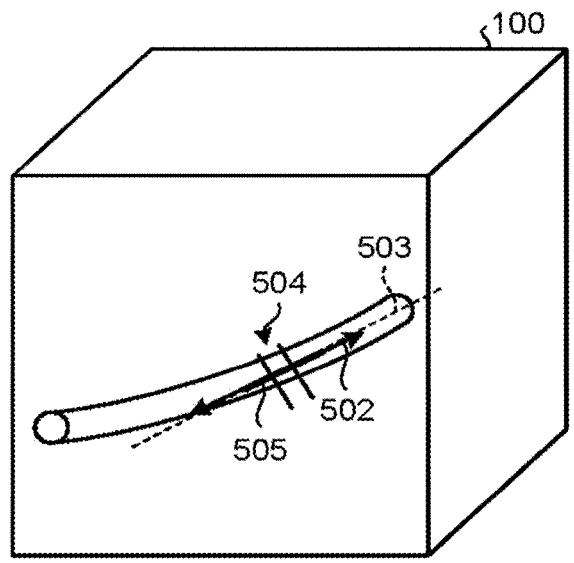

The calculation circuitry 163 arranges, as an optimum line 503, a line that passes through the observation area and that coincides with the blood vessel running vector 502, as depicted in FIG. 10. In other words, the calculation circuitry 163 arranges the optimum line 503 parallel to the blood vessel running vector 502 (the running direction of the blood vessel in the observation area, which has been calculated by use of the blood vessel region). The angle between the optimum line 503 and the blood vessel running vector 502 becomes "0 degrees", and an error in the blood flow velocity information collected from a scan line corresponding to the optimum line 503 becomes the smallest. In other words, the optimum line 503 serves, in the X-ray CT volume data 100, as a marker corresponding to an optimum line marker. As depicted in FIG. 10, the calculation circuitry 163 arranges a double line 504 containing the observation area, perpendicular to the optimum line 503. The double line 504 serves, in the X-ray CT volume data 100, as a marker corresponding to an optimum sampling gate. The optimum line 503 and the double line 504 serve as an optimum collection range for collecting Doppler waveforms of the observation area in the PW mode.

As depicted in FIG. 10, the calculation circuitry 163 then arranges a running line 505 passing through the observation area and extending in the running direction of the blood vessel in the observation area. In other words, the calculation circuitry 163 arranges the running line 505 perpendicularly to the double line 504. The running line 505 serves, in the X-ray CT volume data 100, as a marker corresponding to an optimum angle marker that enables a highly accurate angle correction.

The calculation circuitry 163 then moves the optimum line 503 while the position of the observation area is kept stationary within the above-described three-dimensional range 300, in order to search for the collection range and the collection cross-section. Note that, because it is currently in the PW mode, the calculation circuitry 163 moves the optimum line 503 while keeping the relative positional relation thereof with the optimum line 503 and the double line 504. Here, the calculation circuitry 163 does not move the running line 505.

Figure 11:
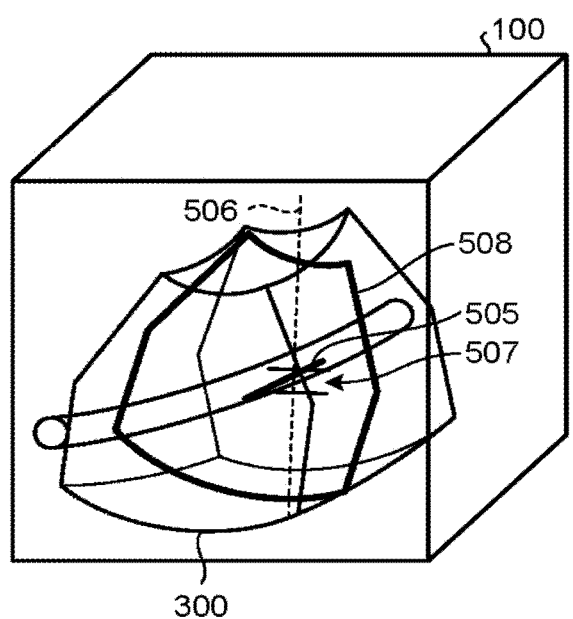

The calculation circuitry 163 then searches for a position that is a scan cross-section that enables scanning of the moved optimum line 503 and that gives the smallest angle between the moved optimum line 503 and the blood vessel running vector 502. The calculation circuitry 163 calculates the collection position information by searching with the above search condition. Thus, as depicted in FIG. 11, the calculation circuitry 163 calculates the positions of "a line 506 and a double line 507" that satisfy the above search condition as the position of the collection range. As depicted in FIG. 11, the calculation circuitry 163 further calculates the position of "a frame 508" that satisfies the above search condition as the position of the collection cross-section. Thus, the calculation circuitry 163 calculates the collection position information. Note that, as depicted in FIG. 11, the position of the running line 505 is maintained.

Figure 8:
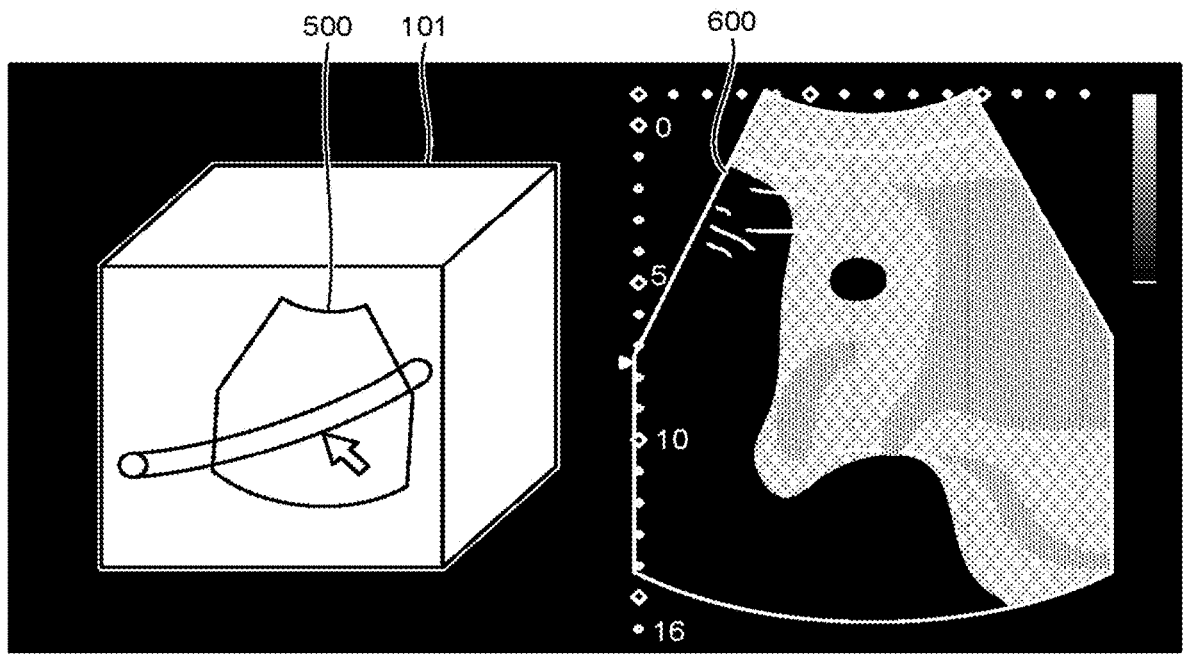

The guide image generation circuitry 164 then generates guide image data by superimposing the markers indicating the "line 506 and double line 507", the "frame 508", and the "running line 505", respectively, on the "VR image data 101 and frame 500" depicted in the left illustration in FIG. 8. That is, as depicted in the left illustration in FIG. 12, the guide image generation circuitry 164 superimposes a dotted line frame 509 indicating the frame 508, superimposes a dotted line 510 indicating the line 506, superimposes a double line 511 indicating the double line 507, and superimposes a line 512 indicating the running line 505 as an angle marker for angle correction. The guide image generation circuitry 164 depicts the dotted line frame 509 in green so that it can be differentiated from the frame 500. Consequently, the guide image data is displayed on the display 2 under the control of the control circuitry 18.

Figure 12:
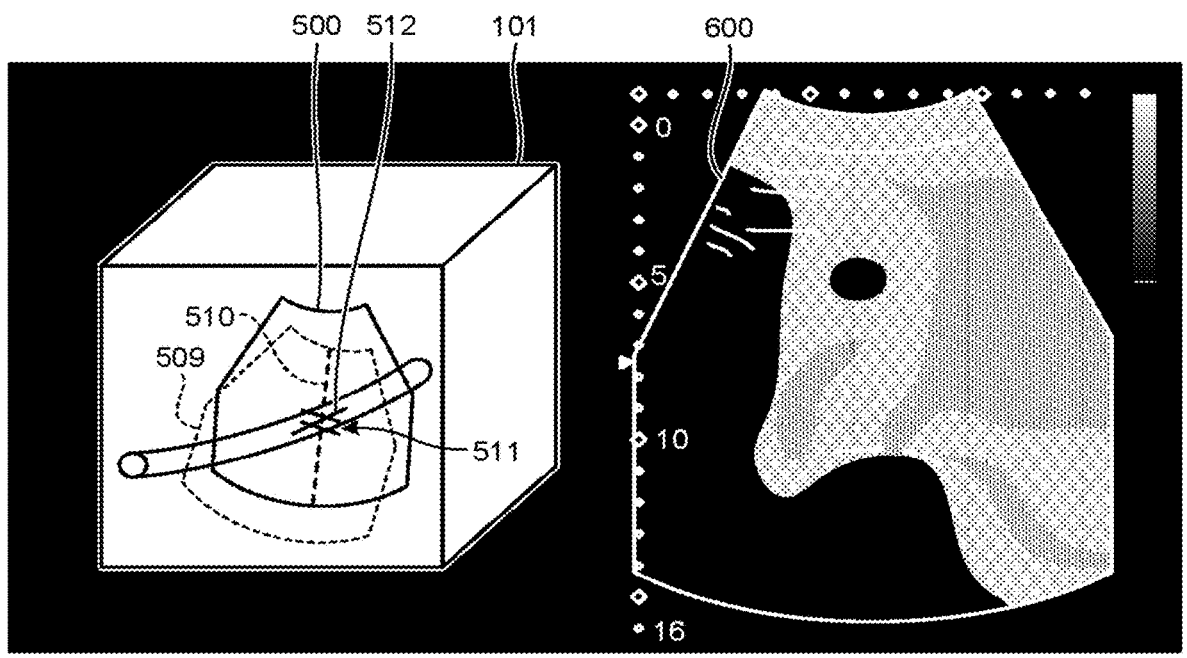

That is, the dotted line frame 509 works as marker indicating the collection cross-section. The dotted line 510 and the double line 511 work as markers indicating the collection range. The operator starts moving the ultrasonic probe 1 with reference to the guide image data depicted in the left illustration in FIG. 12. In response to movement of the ultrasonic probe 1, B mode image data in the right illustration in FIG. 12 is updated, and the position of the frame 500 moves on the basis of the cross-section position information obtained from the correspondence relation. With reference to the frame 500 that is moving, the operator starts moving the ultrasonic probe 1 so that the frame 500 can coincide with the dotted line frame 509.

Figure 13:
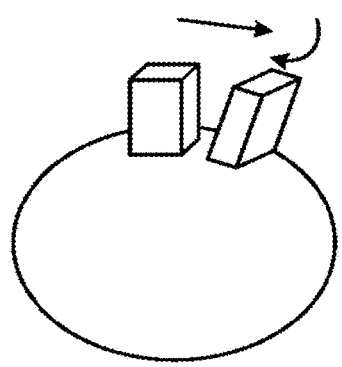

Furthermore, the control circuitry 18 may display on the display 2, along with the guide image data, information needed by the operator in moving the ultrasonic probe 1 to a position at which the collection cross-section is scanned. For example, the guide image generation circuitry 164 acquires, from the internal memory circuitry 17, a three-dimensional body mark corresponding to an area to be photographed. For example, the guide image generation circuitry 164 then arranges two probe frame formats on the three-dimensional body mark, as depicted in FIG. 13. The guide image generation circuitry 164 arranges one of the probe frame formats at a position corresponding to the position of the ultrasonic probe 1 at the time of a request to start navigation, and the other one of the probe frame format at a position corresponding to the position of the ultrasonic probe 1 at the time of scanning of the collection cross-section. As depicted in FIG. 13, for example, the guide image generation circuitry 164 then arranges arrows indicating a parallel-shift movement and a rotation movement, respectively, as operations to be performed at the position that allows scanning of the collection cross-section. The control circuitry 18 then displays image data depicted in FIG. 13 on the display 2.

The guide image generation circuitry 164 may generate and display, at the position of the frame 500, guide image data on which B mode image data is superimposed. Additionally, in the present embodiment, two-dimensional image data of the X-ray CT volume data 100 used for the guide image data may be MPR image data. In this case, the operator may thumbnail a plurality of pieces of the guide image data using a plurality of pieces of MPR image data or may display them as moving images. Furthermore, in the present embodiment, the operator who has referred to the guide image data may adjust the positions of the collection range and the collection cross-section.

Figure 14:
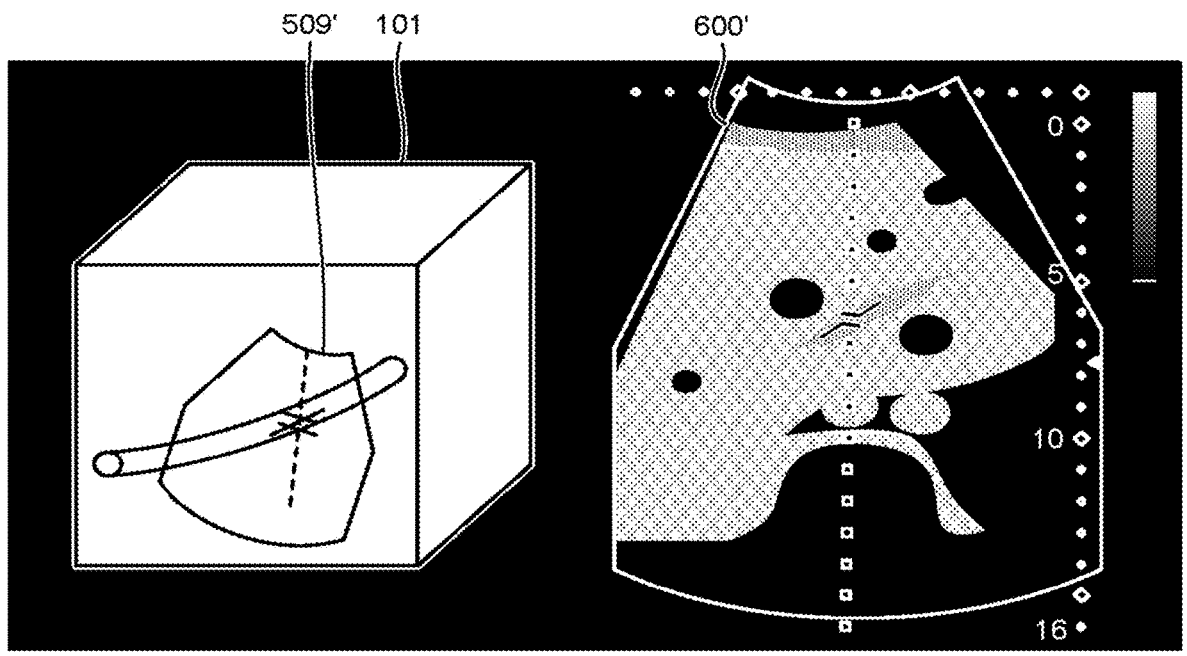
FIG. 14 is an illustration for explaining a display form at the completion of the navigation.

When the operator has then moved the ultrasonic probe 1 to the position at which the collection cross-section is scanned, the control circuitry 18 causes information to be output that notifies the operator that the collection cross-section is being scanned. Additionally, when the operator has moved ultrasonic probe 1 to the position at which the collection cross-section is scanned, the control circuitry 18 displays the collection range while superimposing the collection range on ultrasonic image data of the collection cross-section. FIG. 14 is an illustration for explaining a display form at the completion of the navigation.

When a scan cross-section being scanned by the ultrasonic probe 1 has reached the position corresponding to the dotted line frame 509, i.e., when the frame 500 overlaps the dotted line frame 509, the guide image generation circuitry 164 deletes the frame 500 and changes the green dotted line frame 509 into a green solid line 509' as depicted in FIG. 14. In this manner, the operator can recognize that the collection cross-section is being scanned. Note that, at the same time, the guide image generation circuitry 164 or the image generation circuitry 14 may change the yellow frame 600 into a green frame 600', as depicted in FIG. 14. Also in this manner, the operator can recognize that the collection cross-section is being scanned.

Furthermore, when the frame 500 overlaps the dotted line frame 509, the guide image generation circuitry 164 or the image generation circuitry 14 superimposes on B mode image data of the collection cross-section a "line marker and sampling gate" corresponding to the "dotted line 510 and the double line 511, which are markers for the collection range in the guide image data", as depicted in FIG. 14. The guide image generation circuitry 164 or the image generation circuitry 14 further superimposes an "angle marker" corresponding to the "line 512 serving as a marker for angle correction in the guide image data", as depicted in FIG. 14. In the present embodiment, the operator may adjust the "line marker and sampling gate" superimposed on B mode image data of the collection cross-section. In this case, the positions of the respective markers in the guide image data may be moved in tandem with one another.

The control circuitry 18 then start collection of blood flow velocity information (Doppler waveforms) in the collection range. Note that, when Doppler waveforms are collected, the Doppler process circuitry 13 does not use the angle between an angle marker and a line marker that are superimposed on B mode image data. The Doppler process circuitry 13 uses the angle between the running line 505 and the line 506 as "θ" for angle correction.

A display form for a Doppler waveform may be selected by the operator or may have been set at the initial setting. Display formats for a Doppler waveform that are implementable in the present embodiment are described herein below by way of FIG. 15 to FIG. 18. FIG. 15 to FIG. 18 are diagrams for explaining Doppler waveform display forms according to the present embodiment.

Figure 15:
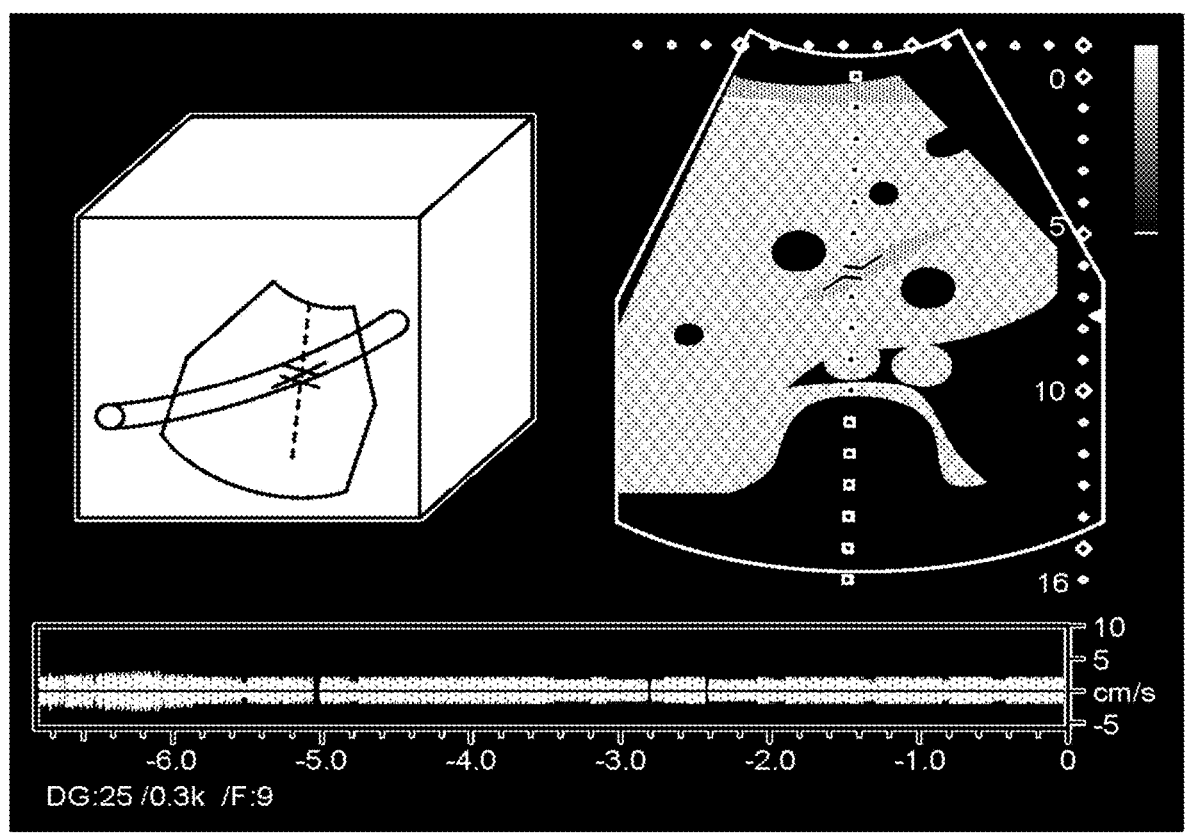
FIG. 15, FIG. 16, FIG. 17 and FIG. 18 are illustrations for explaining a display form of Doppler waveforms according to the present embodiment.

The display form depicted in FIG. 15 is used to further display Doppler waveforms in addition to the display form at the completion of navigation depicted in FIG. 14. In FIG. 15, the display 2 displays thereon guide image data and B mode image data side by side, and displays thereon a Doppler waveform below the guide image data and the B mode image data.

Figure 16:
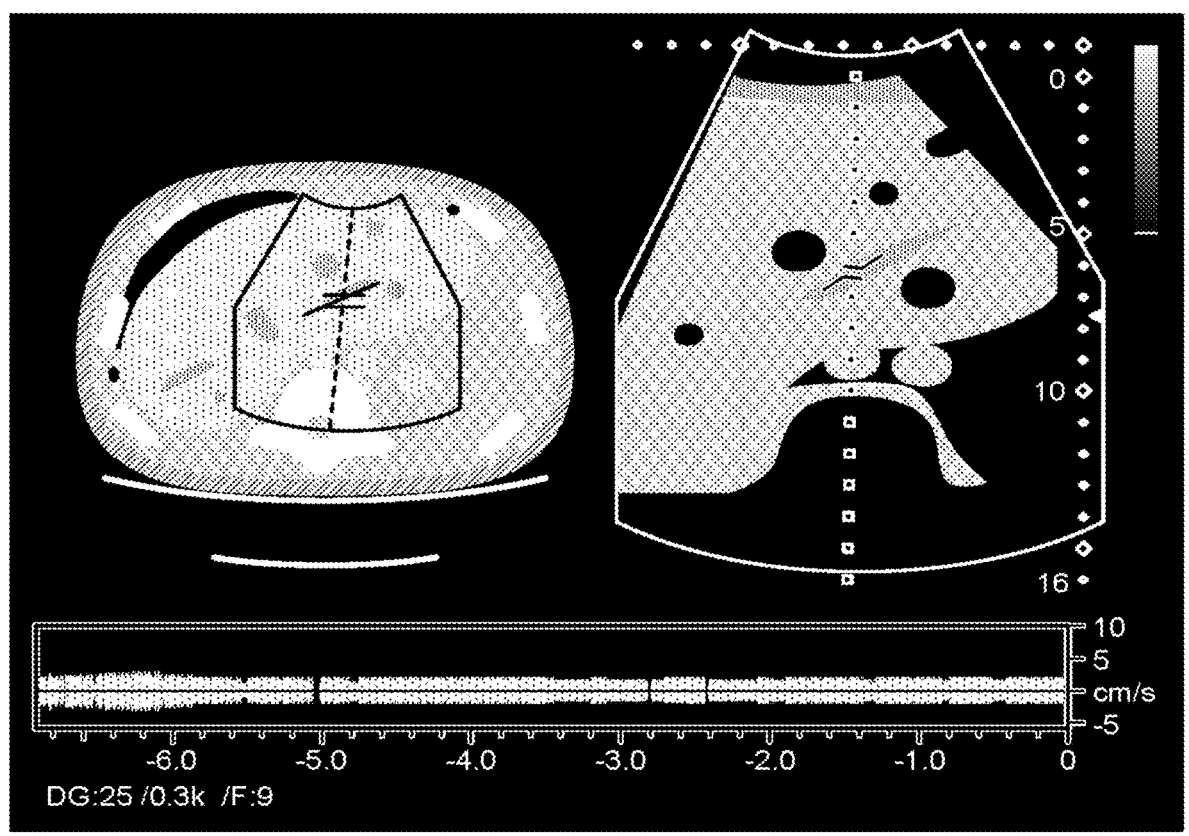

Unlike the display form depicted in FIG. 15, the display form depicted in FIG. 16 is used to display, in place of guide image data using the VR image data 101, image data obtained by superimposing, on MPR image data, a marker corresponding to a collection cross-section, a marker corresponding to an collection range, and a marker corresponding to an angle marker. The MPR image data has been obtained by cutting the X-ray CT volume data 100 along a cross-section thereof that contains a collection cross-section.

Figure 17:
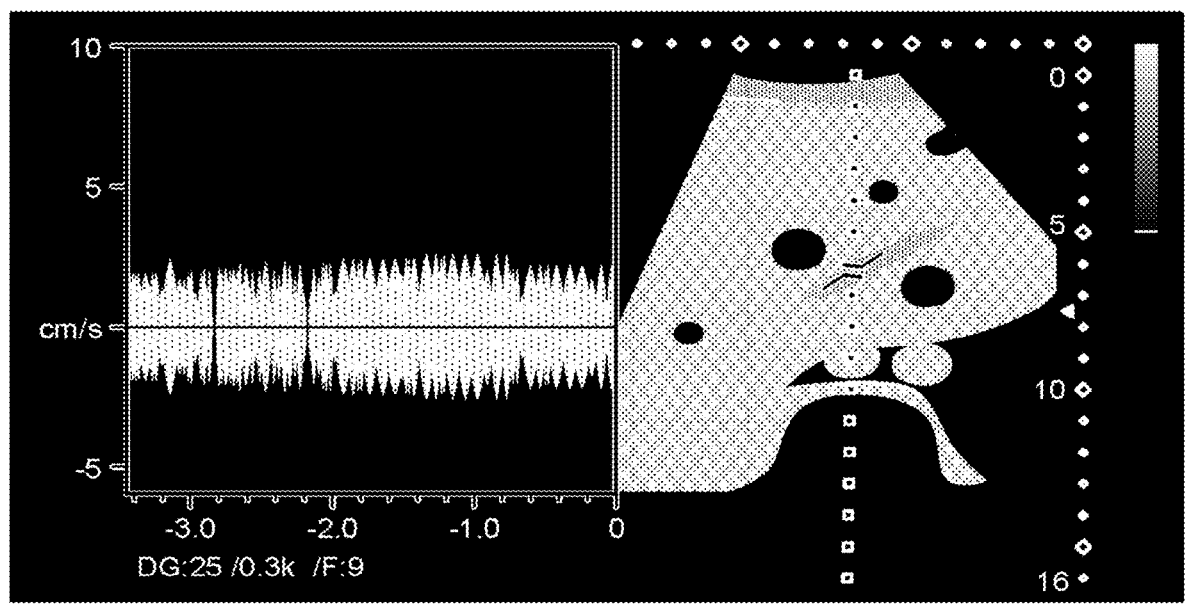

A display form depicted in FIG. 17 enables display of Doppler waveforms in a display region of the guide image data so as to enable side by side display of the Doppler waveform and B mode image data. A display form depicted in FIG. 18 enables color Doppler image data in the color Doppler mode to be superimposed on a part of the B mode image data displayed in the display form in FIG. 17. In the present embodiment, a display form enabling display of a three-dimensional body mark may be optionally implemented.

Figure 18:
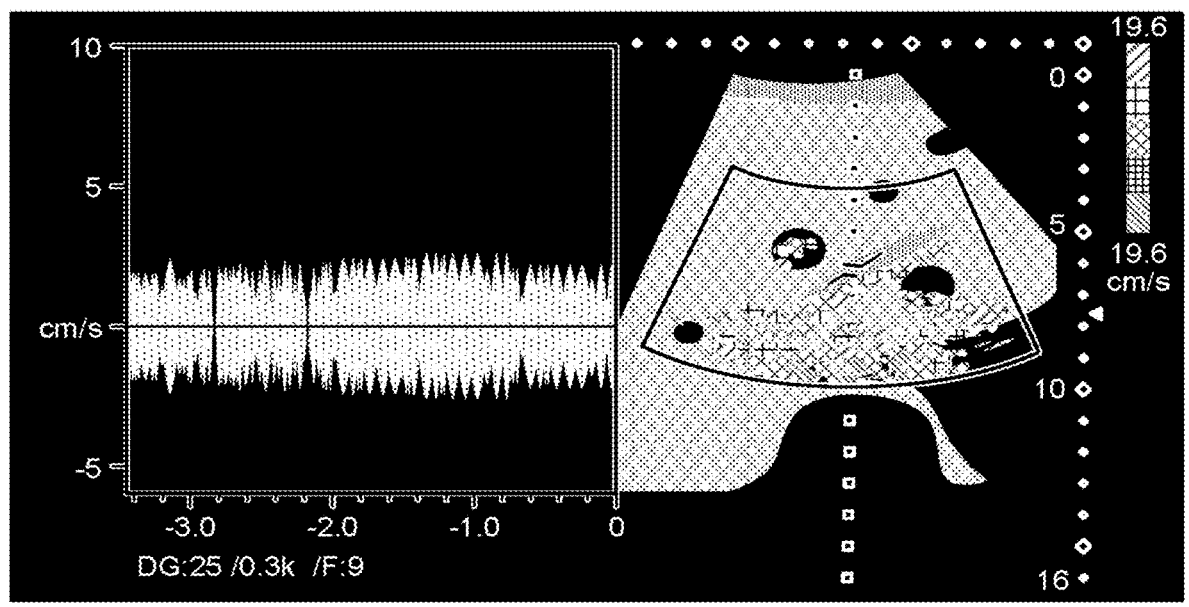

Here, in the display form depicted in FIG. 18, color Doppler image data is displayed in a color ROI defined by the operator as a region of interest (ROI) on the B mode image data. A scan cross-section being ultrasonically scanned by the ultrasonic probe 1 at the completion of the navigation is a long-axis cross-section passing through the long axis of a blood vessel or a cross-section near the long-axis cross-section of the blood vessel. The long-axis cross-section of a blood vessel or a cross-section near the long-axis cross-section of the blood vessel contains a line through which the blood vessel runs, and serves as a cross-section from which blood flow information such as a velocity, a dispersion, and power can be highly accurately calculated. That is, the display form depicted in FIG. 18 enables the operator to refer to not only Doppler waveforms collected at an optimum position but also color Doppler image data collected from an optimum cross-section.

Thus, the above-described navigation function can be used as a function allowing the operator to move the ultrasonic probe 1, by specifying an observation area, to a cross-section that is an optimum cross-section for Doppler waveform collection and that contains a color ROI from which blood flow information is highly accurately calculated. The navigation function described in the present embodiment can be used as a function allowing the operator to move the ultrasonic probe 1, by specifying an observation area, to a color ROI that enables generation and display of color Doppler image data in which highly accurate blood flow information is visualized.

The foregoing describes navigation performed in the PW mode. When navigation is performed in the CW mode, the above manner is applicable except for the difference that, in the three-dimensional range 300 for example, the optimum line 503 is moved, and the line 506 depicted in FIG. 11 is set as a collection range.

Figure 19:
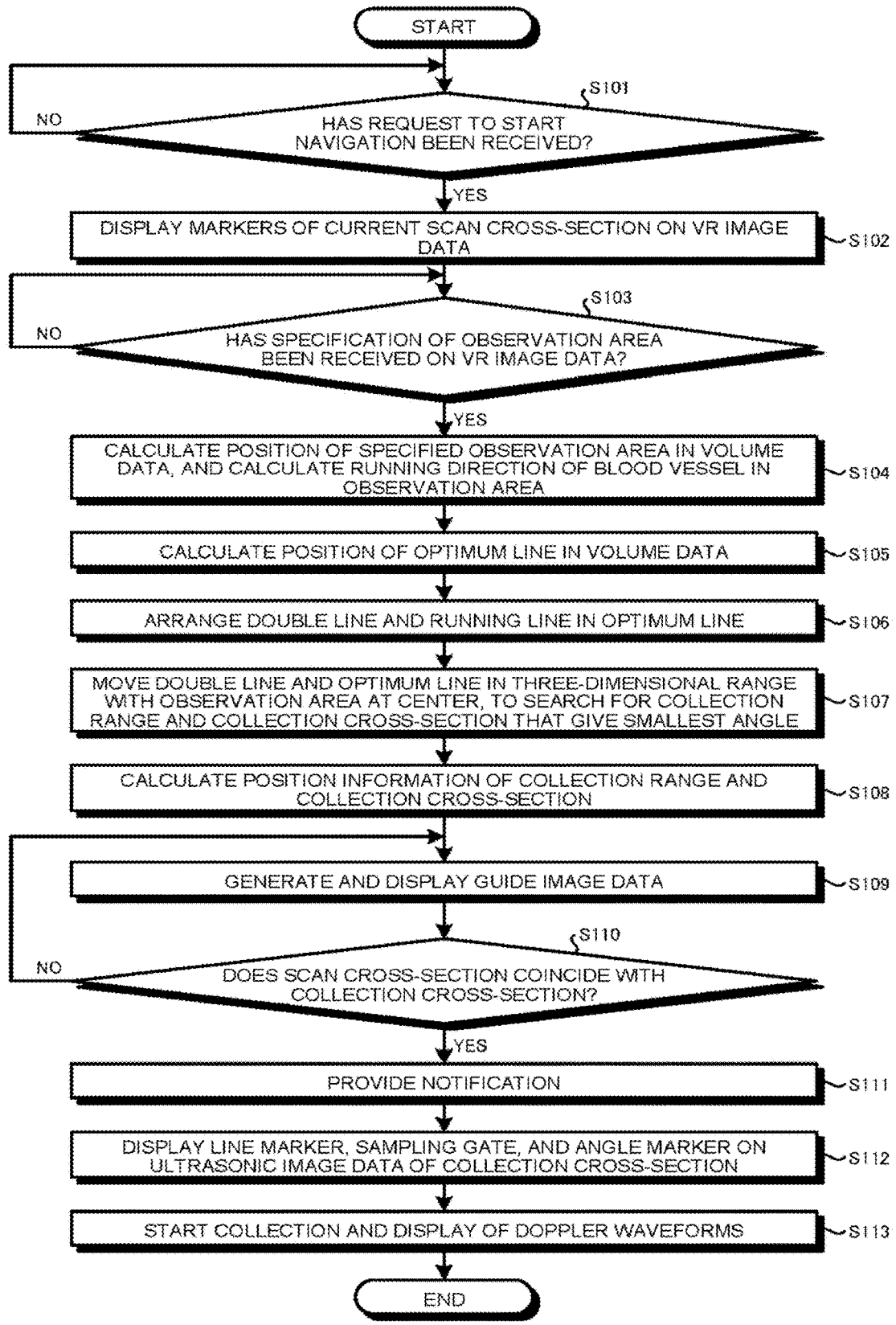
FIG. 19 is a flowchart for explaining one example of processing to be performed by the ultrasonic diagnostic apparatus according to the present embodiment.

Next, processing in the ultrasonic diagnostic apparatus according to the present embodiment performs is described with reference to FIG. 19. FIG. 19 is a flowchart for explaining one example of processing that the ultrasonic diagnostic apparatus according to the present embodiment performs. In connection with FIG. 19, processing after the acquisition of a correspondence relation with volume data of another kind is described. The correspondence relation is intended for calculation of position information of a collection range and a collection cross-section for execution of the PW mode.

As depicted in FIG. 19, the control circuitry 18 according to the present embodiment determines whether the request to start navigation has been received from the operator (Step S101). Here, if the request to start navigation has not been received (No at Step S101), the control circuitry 18 stands by until the request to start navigation is received.

In contrast, if the request to start navigation has been received (Yes at Step S101), the guide image generation circuitry 164 performs processing under the instruction of the control circuitry 18, whereby a marker for a current scan cross-section is superimposed on VR image data of the volume data (Step S102; refer to FIG. 7). Subsequently, the calculation circuitry 163 then determines whether specification of an observation area has been received on the VR image data (Step S103). Here, if specification of an observation area has not been received (No at Step S103), the calculation circuitry 163 stands by until specification of an observation area is received.

In contrast, if specification of an observation area has been received (Yes at Step S103), the calculation circuitry 163 calculates the position of the specified observation area in the volume data, and calculates the running direction of the blood vessel in the observation area (Step S104; refer to FIG. 9). The calculation circuitry 163 then calculates the position of an optimum line in the volume data (step S105; refer to FIG. 10). The calculation circuitry 163 then arranges a double line (corresponding to the sampling gate) and a running line (corresponding to the angle marker) on the optimum line (Step S106; refer to FIG. 10).

The calculation circuitry 163 then moves the double line and the optimum line in the three-dimensional range with the observation area at the center while the position of the running line is maintained, and searches for a collection range and a collection cross-section that corresponds to a scan cross-section allowing scanning of the move optimum line and that give the smallest angle between the moved optimum line and running direction of the blood vessel (Step S107; refer to FIG. 11). The calculation circuitry 163 then calculates position information of the collection range and collection cross-section obtained by the searching (Step S108).

Subsequently, the guide image generation circuitry 164 generates guide image data by using the correspondence relation and the position information, and the display 2 displays thereon the guide image data (Step S109; refer to FIG. 12). The operator starts moving the ultrasonic probe 1 with reference to the guide image data.

Subsequently, the control circuitry 18 determines whether a scan cross-section coincides with the collection cross-section (Step S110). Here, if the scan cross-section does not coincide with collection cross-section (No at Step S110), guide image data for a new scan cross-section is generated and displayed under the control of the control circuitry 18 at Step S109.

In contrast, if the scan cross-section coincides with the collection cross-section (Yes at Step S110), the control circuitry 18 notifies that the collection cross-section is being scanned (Step S111; refer to FIG. 14). The control circuitry 18 then displays the line marker, the sampling gate, and the angle marker while superimposing them on ultrasonic image data of the collection cross-section (step S112).

The control circuitry 18 then starts collection and display of Doppler waveforms (Step S113), and ends the navigation processing.

As described so far, in the present embodiment, position information of an optimum collection range and collection cross-section within a three-dimensional range is calculated by use of the running direction, calculated by use of volume data from which a blood vessel region can be extracted, of a blood vessel in an observation area, so that guide image data is generated and displayed. Consequently, operations that the operator performs to display optimum blood flow velocity information can be simplified in the present embodiment.

The above embodiment is described as a case of searching, with optimum search conditions, for one set of a collection range and a collection cross-section within a three-dimensional scan range of volume data, the three-dimensional scan range corresponding to a three-dimensional range defined as a three-dimensional region that can be scanned. However, a collection cross-section is rigidly a cross-section obtained by searching a virtual space of volume data. For this reason, the following cases may occur: a case where the operator cannot scan a collection cross-section in the actual space when intending to scan the collection cross-section; and a case where scanning a collection cross-section in the actual space results in generation of a shadow due to a bone or the like in B mode image data.

To avoid such cases, the present embodiment may be implemented as a first modified example described below. In the first modified example, the calculation circuitry 163 searches for a position that gives an angle equal to or smaller than a predetermined value between an optimum line moved in the three-dimensional range and the running direction of a blood vessel in an observation area. For example, the predetermined value is "60 degrees".

Figures 20A, 20B:
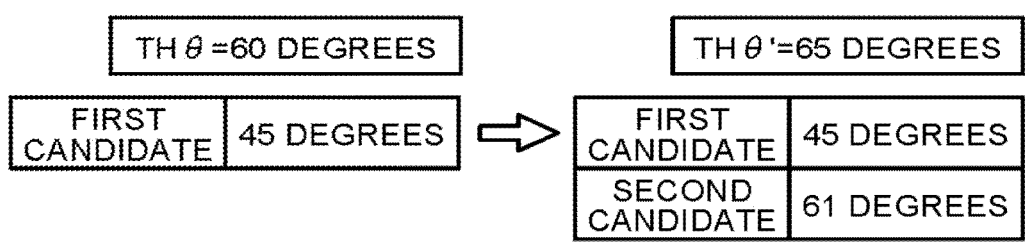
FIG. 20A and FIG. 20B are diagrams for explaining a first modified example.

The calculation circuitry 163 then obtains a plurality of candidate sets each consisting of a candidate collection range and a candidate scan cross-section, and calculates a plurality of pieces of candidate position information. Here, the control circuitry 18 determines ranks of the pieces of candidate position information, for example, in ascending order of the angles. FIG. 20A and FIG. 20B are diagrams for explaining the first modified example.

For example, as depicted in FIG. 20A, when the predetermined value THθ is "60 degrees", the control circuitry 18 sets a piece of candidate position information with "angle: 45 degrees" as a first candidate, sets a piece of candidate position information with "angle: 48 degrees" as a second candidate, and a piece of candidate position information with "angle: 50 degrees" as a third candidate.

Subsequently, when having received from the operator a request to change guide image data based on a piece of candidate position information that has a certain rank among the pieces of candidate position information, the control circuitry 18 displays guide image data based on a piece of candidate position information of a rank succeeding the certain rank. For example, the operator presses down a "Next" button of the input circuitry 3 when an appropriate B mode image has not been displayed from a collection cross-section of the first candidate. In this case, the control circuitry 18 causes guide image data based on position information of the first candidate to be displayed. Note that, in order to notify that a candidate has been changed to another candidate of a lower rank, the control circuitry 18 may change the color of a marker superimposed on guide image data for the second candidate from the color of a marker superimposed on guide image data for the first candidate.

Here, the control circuitry 18 may determine the ranking by a method other than a method using angle values. For example, the control circuitry 18 assigns the first rank to a piece of candidate position information that gives the smallest angle, and assigns the following ranks to the other pieces of candidate position information in ascending order of amount of moving operation from the piece of candidate position information of the first rank. Alternatively, for example, the control circuitry 18 assigns ranks to the plurality of pieces of candidate position information in ascending order of amount of moving operation from the current position of the ultrasonic probe 1.

It is possible that only one candidate set has been extracted by use of the predetermined value. In such a situation, upon receiving from the operator a request to change guide image data based on candidate position information of this candidate set, the calculation circuitry 163 searches for the positions of candidate sets that give values equal to or smaller than a value that exceeds the predetermined value. For example, as depicted in FIG. 20B, when only a first candidate with "angle: 45 degrees" has been obtained by searching on condition that "THθ=60 degrees", the calculation circuitry changes the condition to "THθ'=65 degrees". Consequently, for example, as depicted in FIG. 20B, the calculation circuitry 163 sets, as a second candidate, a candidate set of a candidate collection range and a candidate scan cross-section from which position information with "angle: 61 degrees" can be obtained. The control circuitry 18 then causes guide image data based on position information of "angle: 61 degrees" to be displayed.

In the present embodiment, when no candidate set has been obtained by searching using the predetermined value, searching may be conducted again for the positions of candidate sets that give values equal to or smaller than a value that exceeds the predetermined value. Alternatively, in the present embodiment, when no candidate set has been obtained by searching using the predetermined value, the operator may be notified of a request to define a new three-dimensional scan range that allows scanning of an observation area.

The above embodiment describes a case where, by use of a correspondence relation based on the position sensor 4, cross-section position information corresponding to the position of a cross-section of cross-section image data (B mode image data) generated by the image generation circuitry 14 is acquired in volume data of another kind such as X-ray CT volume data or MRI volume data. However, the above embodiment may also be applied to a case where, using a well-known position matching technique such as the cross-correlation method, the acquisition circuitry 161 acquires, every time cross-section image data is generated, cross-section position information of the cross-section image data in volume data. The above embodiment describes a case of using volume data of another kind such as X-ray CT volume data or MRI volume data from which a blood vessel region can be extracted. However, the present embodiment may also be applied to a case of using volume data, photographed by ultrasound transmission and reception, from which a region where a blood flow exists can be extracted. In this second modified example, color Doppler volume data or power volume data obtained by three-dimensional scanning by the color flow mapping (CFM) method is used as the volume data.

Figure 21:
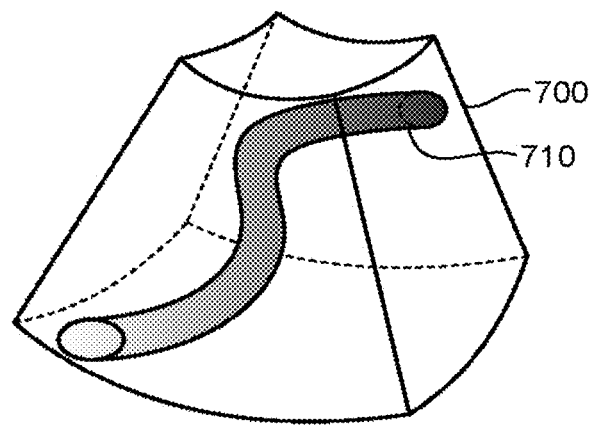
FIG. 21 is an illustration for explaining a second modified example.

For example, the operator conducts scanning in the color Doppler mode when defining a three-dimensional scan range depicted in the left illustration in FIG. 5. For example, from three-dimensional position information of the ultrasonic probe 1 acquired from the position sensor 4 by the acquisition circuitry 161, the control circuitry 18 reconstructs three-dimensional reflected-wave data using respective pieces of two-dimensional reflected-wave data of a plurality of cross-sections, and transmits the reconstructed data to the Doppler process circuitry 13. FIG. 21 is an illustration for explaining the second modified example.

According to this manner, the image generation circuitry 14 generates power volume data 700 as depicted in FIG. 21, for example. The extraction circuitry 162 extracts a blood flow region 710 as depicted in FIG. 21 by extracting voxels to which brightness values according to power values have been assigned. For the blood flow region 710, the running direction of the blood vessel can be calculated. In the second modified example, the correspondence relation between the position of a scan cross-section being scanned by the ultrasonic probe 1 and the position of power volume data 700 can be acquired only on the basis of three-dimensional position information of the ultrasonic probe 1 acquired from the position sensor 4. Ultrasonic volume data, such as the power volume data 700, from which a blood vessel region can be extracted may be ultrasonic volume data generated by scanning a three-dimensional region inside the subject P with, for example, a mechanical 4D probe or a 2D probe.

Figure 22:
FIG. 22 is an illustration for explaining a third modified example.

Furthermore, the navigation processing that the image processor 16 performs is applicable to M mode photography. For example, the M mode is executed for obtaining motion information of a cardiac valve or a myocardium located on a scan line. FIG. 22 is an illustration for explaining a third modified example. For example, the third modified example is applied to a case where a sampling line for the M mode is arranged at its optimum position and angle as depicted in FIG. 22. In this third modified example, conditions with which the sampling line for the M mode comes to its optimum position and angle can be defined, for example, by having the operator specify, on VR image data of volume data of a heart, a direction in which a normal cardiac valve would move, or a direction in which a normal myocardium would move.

Of the various kinds of processing described in the above embodiment, the first modified example, the second modified example and the third modified example, the whole or a part of each of the described kinds of processing as those to be automatically performed may be manually performed, and the whole or a part of each of the pieces described as those to be manually performed may be automatically performed. Furthermore, the processing procedure, the control procedure, the specific names, and information containing various pieces of data and various parameters may be desirably changed.

The respective constituent elements of the devices and apparatuses depicted in the above description are functionally conceptual, and do not necessarily need to be configured physically as depicted. That is, the specific forms of distribution or integration of the devices and apparatuses are not limited to those depicted, and the whole or a part thereof can be configured by being functionally or physically distributed or integrated in any form of units, depending on various types of loads, usage conditions, and the like. Furthermore, the whole of or a part of the various processing functions performed in the respective devices and apparatuses can be implemented by a CPU, and a program executed by the CPU, or implemented as hardware by wired logic.

The image processing method described in the foregoing embodiment, the first modified example, the second modified example and the third modified example can be implemented by executing, on a computer such as a personal computer or a workstation, an image processing program prepared in advance. This program can be distributed via a network such as the Internet. This program can also be recorded on a computer-readable recording medium such as a hard disk, a flexible disk (FD), a compact disc read only memory (CD-ROM), a magnetic optical disc (MO), or a digital versatile disc (DVD), and executed by being read out from the recording medium by the computer.

As described above, according to the embodiment, the first modified example, the second modified example, and the third modified example, operations that the operator performs for displaying blood flow velocity information are simplified.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modified examples as would fall within the scope and spirit of the inventions.

What is claimed is:

1. An ultrasonic diagnostic apparatus, comprising:
an ultrasonic probe configured to perform ultrasonic scanning of a subject and receive reflected waves from the subject; and
an image processor configured to
acquire volume data of the subject photographed by a medical diagnostic imaging apparatus other than the ultrasonic diagnostic apparatus;
generate blood flow information and cross-section image data, in accordance with the reflected waves;
acquire a correspondence relation between coordinates of the volume data and coordinates of the cross-section image data;
extract a blood vessel region from the volume data; and
cause a preferred position marker indicating a preferred collection range on the scan cross-section for collecting the blood flow information and the cross-section image data to be superimposed, in accordance with a direction of the blood vessel region and the correspondence relation.

2. The ultrasonic diagnostic apparatus according to claim 1, wherein
the image processor is further configured to cause the preferred position marker to be superimposed on a preferred scan cross-section marker indicating a position of the scan cross-section that can be scanned, in accordance with the direction of the blood vessel region and the correspondence relation.

3. The ultrasonic diagnostic apparatus according to claim 1, wherein
the image processor is further configured to cause display of a preferred angle marker for making an angle correction to the blood flow information with high accuracy, in accordance with the correspondence relation.

4. The ultrasonic diagnostic apparatus according to claim 1, wherein the image processor is further configured to cause simultaneous display of image data of a moved scan cross-section and volume image data of the same moved cross-section.

* * * * *